(12) United States Patent
Lin et al.

(10) Patent No.: US 7,632,887 B2
(45) Date of Patent: Dec. 15, 2009

(54) PLASTICIZED POLYOLEFIN COMPOSITIONS

(75) Inventors: Chon Yie Lin, Houston, TX (US); Chia Yung Cheng, Seabrook, TX (US); Henry Wu-Hsiang Yang, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/634,351

(22) Filed: Aug. 4, 2003

(65) Prior Publication Data

US 2004/0054040 A1 Mar. 18, 2004

Related U.S. Application Data

(60) Provisional application No. 60/402,665, filed on Aug. 12, 2002.

(51) Int. Cl.
*C08K 5/01* (2006.01)
*C08L 23/12* (2006.01)
*C08L 23/14* (2006.01)
*C08J 3/18* (2006.01)

(52) U.S. Cl. .............. 524/491; 524/490; 524/848; 524/582; 524/583

(58) Field of Classification Search ............ 524/474, 524/570, 490, 491, 582–583, 848; 525/490, 525/474, 280, 240
See application file for complete search history.

(56) References Cited

U.S. PATENT DOCUMENTS

| | | | |
|---|---|---|---|
| 2,567,016 A | 9/1951 | Gessler et al. ............. 260/45.5 |
| 3,149,178 A | 9/1964 | Hamilton et al. .......... 260/683.9 |
| 3,201,364 A | 8/1965 | Salyer ....................... 260/33.6 |
| 3,228,896 A | 1/1966 | Canterino .................... 260/2.5 |
| 3,235,529 A | 2/1966 | Nagle ........................ 260/33.6 |
| 3,239,478 A | 3/1966 | Harlan, Jr. ..................... 260/27 |
| 3,281,390 A | 10/1966 | O'Leary, Jr. ............... 260/33.6 |
| 3,299,568 A | 1/1967 | Tobolsky ......................... 47/9 |
| 3,308,086 A | 3/1967 | Wartman .................... 260/31.6 |
| 3,318,835 A | 5/1967 | Hagemeyer, Jr. et al. ... 260/31.6 |
| 3,338,778 A | 8/1967 | Hutchins et al. ........... 260/33.2 |
| 3,361,702 A | 1/1968 | Wartman et al. ............ 264/331 |
| 3,415,925 A | 12/1968 | Marans ........................ 264/331 |
| 3,437,627 A | 4/1969 | Gude et al. .................... 424/63 |
| 3,439,088 A | 4/1969 | Edman ......................... 424/63 |
| 3,464,949 A | 9/1969 | Wartman et al. ........... 260/33.4 |
| 3,475,368 A | 10/1969 | Metz .......................... 260/33.4 |
| 3,536,796 A | 10/1970 | Rock ........................... 264/49 |
| 3,541,039 A | 11/1970 | Whiton ...................... 260/31.6 |
| 3,563,934 A | 2/1971 | Burnett ...................... 260/30.4 |
| 3,590,528 A | 7/1971 | Shepherd |
| 3,686,385 A | 8/1972 | Rohn |
| 3,752,779 A | 8/1973 | Maciejewski ............. 260/23 H |
| 3,818,105 A | 6/1974 | Coopersmith et al. ....... 424/358 |
| 3,821,148 A | 6/1974 | Makowski et al. ...... 260/30.6 R |
| 3,828,105 A | 8/1974 | Saurano et al. |
| 3,839,261 A | 10/1974 | Aronoff et al. .......... 260/31.8 F |
| 3,860,543 A | 1/1975 | Masuda et al. ........ 260/28.5 AV |
| 3,894,120 A | 7/1975 | Frese et al. |
| 3,925,504 A | 12/1975 | Koleske et al. .............. 260/823 |
| 3,925,947 A | 12/1975 | Meyers et al. ................ 52/208 |
| 3,945,975 A | 3/1976 | Strack .................. 260/33.6 AQ |
| 3,957,898 A | 5/1976 | Girotti et al. |
| 3,988,276 A | 10/1976 | Kutch et al. .................... 260/24 |
| 4,006,115 A | 2/1977 | Elbert .................... 260/31.8 N |
| 4,010,127 A | 3/1977 | Taka et al. ............. 260/31.8 N |
| 4,041,002 A | 8/1977 | Aboshi et al. |
| 4,041,103 A | 8/1977 | Davison et al. |
| 4,061,805 A | 12/1977 | Thompson et al. ......... 260/23 R |
| 4,063,002 A | 12/1977 | Wilson, Jr. .................. 428/411 |
| 4,073,782 A | 2/1978 | Kishi et al. ............... 260/23 H |
| 4,087,505 A | 5/1978 | Sugimoto et al. |
| 4,092,282 A | 5/1978 | Callan .......................... 260/26 |
| 4,094,850 A | 6/1978 | Morgan et al. ........ 260/31.8 PQ |

(Continued)

FOREIGN PATENT DOCUMENTS

CS 215313 8/1982

(Continued)

OTHER PUBLICATIONS

Parapol 450: product information and data sheet.*
Parapol 950: product information and data sheet.*
Hawley's Condensed Chemical Dictionary, 14$^{th}$ Ed. (2001) p. 835.*
Gedeon et al. "Use of "Clean" Paraffinic Processing Oils to Improve TPE Properties." Abstract from presentation at TPE's 2000, Philadelphia, PA, Sep. 27-28, 1999.*
JP 11-49903 (abstract and translation in English).*
Neste Oil techincal data sheet; Nexbase polyalpholefins, 2002.*

(Continued)

*Primary Examiner*—David Wu
*Assistant Examiner*—Rip A. Lee
(74) *Attorney, Agent, or Firm*—Kevin M. Faulkner; Catherine L. Bell; Robert L. Abdon

(57) ABSTRACT

The present invention relates to plasticized polyolefin compositions comprising a polyolefin and a non-functionalized plasticizer; wherein the non-functionalized plasticizer may comprise $C_6$ to $C_{200}$ paraffins (including branched and normal paraffins) having a pour point of less than −5° C. In one embodiment, the non-functionalized plasticizer is an isoparaffin comprising $C_6$ to $C_{25}$ isoparaffins. In another embodiment the non-functionalized plasticizer is a polyalphaolefin comprising $C_{10}$ to $C_{100}$ n-paraffins. The polyolefin may be a polypropylene homopolymer, copolymer, impact copolymer, or blends thereof, and may include a plastomer. Non-limiting examples of desirable article of manufacture made from compositions of the invention include films, tubes, pipes, sheets, fibers, woven and nonwoven fabrics, automotive components, furniture, sporting equipment, food storage containers, transparent and semi-transparent articles, toys, tubing and pipes, and medical devices.

48 Claims, 8 Drawing Sheets

U.S. PATENT DOCUMENTS

| | | | |
|---|---|---|---|
| 4,097,543 A | 6/1978 | Haag et al. | |
| 4,104,216 A | 8/1978 | Clampitt | 260/23 AR |
| 4,110,185 A | 8/1978 | Williams et al. | 204/159.2 |
| 4,113,802 A * | 9/1978 | Matteoli et al. | 525/270 |
| 4,118,359 A | 10/1978 | Brenner | 260/30.8 R |
| 4,118,362 A | 10/1978 | Makowski et al. | 260/32.6 A |
| 4,131,587 A | 12/1978 | Brenner | 260/27 R |
| 4,132,698 A | 1/1979 | Gessler et al. | 260/33.6 AQ |
| 4,136,072 A | 1/1979 | Ladish et al. | 260/27 R |
| 4,138,378 A | 2/1979 | Doss | 260/27 BB |
| 4,147,831 A | 4/1979 | Balinth | 428/356 |
| 4,153,582 A | 5/1979 | Puffr et al. | 252/511 |
| 4,153,588 A | 5/1979 | Makowski et al. | 260/23.5 A |
| 4,153,594 A | 5/1979 | Wilson, Jr. | 260/31.8 R |
| 4,154,244 A | 5/1979 | Becker et al. | 128/342 B |
| 4,154,712 A | 5/1979 | Lee, Jr. | 260/29.1 R |
| 4,157,992 A | 6/1979 | Lundberg et al. | 260/23.5 A |
| 4,166,057 A | 8/1979 | Takemori | 260/33.6 RQ |
| 4,169,822 A | 10/1979 | Kutch et al. | 260/27 BB |
| 4,170,586 A | 10/1979 | Clampitt et al. | 260/33.6 PQ |
| 4,175,069 A | 11/1979 | Brenner | 260/32.6 A |
| 4,189,411 A | 2/1980 | Haaf | 260/27 R |
| 4,210,570 A | 7/1980 | Trotter et al. | 260/33.6 A |
| 4,221,887 A | 9/1980 | Brenner et al. | 525/332 |
| 4,229,337 A | 10/1980 | Brenner | 260/32.6 A |
| 4,237,083 A | 12/1980 | Young et al. | 264/41 |
| 4,274,932 A | 6/1981 | Williams et al. | 204/159.2 |
| 4,288,358 A | 9/1981 | Trotter et al. | 260/31.8 M |
| 4,288,480 A | 9/1981 | Grzywinski et al. | 428/40 |
| 4,289,668 A | 9/1981 | Li | 260/23 AR |
| 4,311,628 A | 1/1982 | Abdou-Sabet et al. | 260/33.6 AQ |
| 4,321,334 A | 3/1982 | Chatterjee | |
| 4,322,336 A | 3/1982 | Machurat et al. | 524/104 |
| 4,325,850 A | 4/1982 | Mueller | 524/228 |
| 4,327,007 A | 4/1982 | Vanderkooi, Jr. et al. | 524/315 |
| 4,335,026 A | 6/1982 | Balinth | 524/271 |
| 4,335,034 A | 6/1982 | Zuckerman et al. | 524/423 |
| 4,340,513 A | 7/1982 | Moteki et al. | 524/13 |
| 4,347,332 A | 8/1982 | Odorzynski et al. | 524/169 |
| 4,352,823 A | 10/1982 | Cherukuri et al. | 426/5 |
| 4,358,384 A | 11/1982 | Newcomb | |
| 4,369,284 A | 1/1983 | Chen | 524/476 |
| 4,379,169 A | 4/1983 | Reggio et al. | 426/3 |
| 4,387,108 A | 6/1983 | Koch et al. | 426/4 |
| 4,399,248 A | 8/1983 | Singh et al. | 524/205 |
| 4,399,251 A | 8/1983 | Lee | 524/481 |
| 4,403,005 A | 9/1983 | Nevins et al. | 428/48 |
| 4,403,007 A | 9/1983 | Coughlin | 428/95 |
| 4,409,345 A | 10/1983 | Moteki et al. | 524/13 |
| 4,430,289 A | 2/1984 | McKinney et al. | |
| 4,434,258 A | 2/1984 | Schumacher et al. | 524/13 |
| 4,438,228 A | 3/1984 | Schenck | 524/109 |
| 4,438,229 A | 3/1984 | Fujimori et al. | 524/109 |
| 4,440,829 A | 4/1984 | Gerace et al. | 428/343 |
| 4,450,250 A | 5/1984 | McConnell et al. | 524/141 |
| 4,452,820 A | 6/1984 | D'Amelia et al. | 426/3 |
| 4,459,311 A | 7/1984 | DeTora et al. | 426/3 |
| 4,460,729 A | 7/1984 | Books | 524/394 |
| 4,467,010 A * | 8/1984 | Shii et al. | 428/212 |
| 4,467,065 A | 8/1984 | Williams et al. | 524/296 |
| 4,469,770 A | 9/1984 | Nelson | 430/110 |
| 4,483,952 A | 11/1984 | Uchiyama | |
| 4,497,926 A | 2/1985 | Toy | 524/271 |
| 4,504,604 A | 3/1985 | Pilkington et al. | 523/167 |
| 4,518,615 A | 5/1985 | Cherukuri et al. | 426/4 |
| 4,529,666 A | 7/1985 | Salzburg et al. | 428/475.8 |
| 4,532,305 A | 7/1985 | Dickinson | 525/390 |
| 4,536,537 A * | 8/1985 | Klingensmith et al. | 524/481 |
| 4,542,053 A | 9/1985 | Nevins et al. | 428/48 |
| 4,551,507 A | 11/1985 | Haylock et al. | 525/347 |
| 4,552,801 A | 11/1985 | Odorzynski et al. | 428/220 |
| 4,579,901 A | 4/1986 | Allen et al. | 524/294 |
| 4,584,215 A | 4/1986 | Bré et al. | 428/36.9 |
| 4,616,052 A | 10/1986 | Habibullah | 524/104 |
| 4,645,791 A | 2/1987 | Theodore et al. | 524/490 |
| 4,659,757 A | 4/1987 | Okamoto et al. | 523/436 |
| 4,663,220 A * | 5/1987 | Wisneski et al. | 428/221 |
| 4,666,959 A | 5/1987 | Weissberger et al. | 523/137 |
| 4,666,968 A | 5/1987 | Downey et al. | 524/296 |
| 4,670,341 A | 6/1987 | Lundsager | 428/372 |
| 4,684,682 A | 8/1987 | Lee, Jr. | 524/141 |
| 4,693,838 A * | 9/1987 | Varma et al. | 508/233 |
| 4,703,078 A * | 10/1987 | Maehara et al. | 524/476 |
| 4,726,989 A | 2/1988 | Mrozinski | |
| 4,745,143 A | 5/1988 | Mason et al. | 524/98 |
| 4,746,388 A | 5/1988 | Inaba et al. | 524/102 |
| 4,749,734 A | 6/1988 | Williams et al. | 524/102 |
| 4,764,535 A | 8/1988 | Leicht | 521/51 |
| 4,772,657 A | 9/1988 | Akiyama et al. | 524/504 |
| 4,774,277 A | 9/1988 | Janac et al. | 524/474 |
| 4,814,375 A | 3/1989 | Esposito | 524/505 |
| 4,824,718 A | 4/1989 | Hwang | |
| 4,824,891 A | 4/1989 | Laurent et al. | 524/264 |
| 4,833,172 A | 5/1989 | Schwarz et al. | 521/621 |
| 4,833,195 A | 5/1989 | Adur et al. | 524/528 |
| 4,840,988 A | 6/1989 | Nakayama et al. | 524/476 |
| 4,845,137 A | 7/1989 | Williams et al. | 524/108 |
| 4,857,646 A | 8/1989 | Jaffe | |
| 4,863,785 A | 9/1989 | Berman et al. | |
| 4,912,148 A | 3/1990 | Kim et al. | |
| 4,914,145 A | 4/1990 | Tohdoh et al. | 524/285 |
| 4,919,992 A | 4/1990 | Blundell et al. | 428/131 |
| 4,939,040 A | 7/1990 | Oreglia et al. | 428/518 |
| 4,948,840 A | 8/1990 | Berta | |
| 4,952,457 A | 8/1990 | Cartier et al. | 428/425.6 |
| 4,957,958 A | 9/1990 | Schleifstein | 524/169 |
| 4,959,285 A | 9/1990 | Hoffmann | 430/11 |
| 4,959,396 A | 9/1990 | Yankov et al. | 521/61 |
| 4,959,402 A | 9/1990 | Williams et al. | 524/49 |
| 4,960,820 A | 10/1990 | Hwo | 524/528 |
| 4,994,552 A | 2/1991 | Williams et al. | |
| 4,995,884 A | 2/1991 | Ross et al. | 8/115.6 |
| 4,996,094 A | 2/1991 | Dutt | 428/212 |
| 5,026,756 A | 6/1991 | Arendt | 524/293 |
| 5,028,647 A | 7/1991 | Haylock et al. | 524/290 |
| 5,049,605 A | 9/1991 | Rekers | |
| 5,076,988 A | 12/1991 | Rifi | |
| 5,079,287 A * | 1/1992 | Takeshi et al. | 524/528 |
| 5,080,942 A | 1/1992 | Yau | 428/34.9 |
| 5,091,454 A | 2/1992 | Arendt | 524/293 |
| 5,093,197 A | 3/1992 | Howard et al. | 428/372 |
| 5,105,038 A * | 4/1992 | Chen et al. | 585/10 |
| 5,106,899 A | 4/1992 | Maresca | 524/372 |
| 5,114,763 A | 5/1992 | Brant et al. | |
| 5,116,626 A | 5/1992 | Synosky et al. | 426/3 |
| 5,124,384 A | 6/1992 | Goldstein | 524/169 |
| 5,143,978 A * | 9/1992 | Berta | 525/240 |
| 5,149,736 A | 9/1992 | Gamarra | 524/490 |
| 5,162,436 A | 11/1992 | Davis et al. | |
| 5,171,908 A | 12/1992 | Rudnick | 585/255 |
| 5,173,317 A | 12/1992 | Hartman et al. | 426/6 |
| 5,180,865 A | 1/1993 | Heilman et al. | |
| 5,206,276 A | 4/1993 | Lee, Jr. | 524/151 |
| 5,230,843 A | 7/1993 | Howard et al. | 264/41 |
| 5,231,128 A | 7/1993 | Nakata et al. | 524/445 |
| 5,238,735 A | 8/1993 | Nagou et al. | 428/304.4 |
| 5,240,966 A * | 8/1993 | Iwasaki et al. | 521/54 |
| 5,250,628 A | 10/1993 | Seguela et al. | 525/210 |
| 5,254,378 A | 10/1993 | Krueger et al. | |
| 5,256,717 A | 10/1993 | Stauffer et al. | 524/293 |
| 5,258,419 A | 11/1993 | Rolando et al. | 522/109 |
| 5,264,277 A | 11/1993 | Frognet et al. | |
| 5,264,474 A | 11/1993 | Schleifstein et al. | 524/169 |

| | | | | | | | |
|---|---|---|---|---|---|---|---|
| 5,278,220 | A | 1/1994 | Vermeire et al. ............ 524/490 | 6,084,031 | A * | 7/2000 | Medsker et al. ............ 525/192 |
| 5,286,500 | A | 2/1994 | Synosky et al. ................ 426/3 | 6,086,996 | A | 7/2000 | Rancich et al. ........ 428/355 EN |
| 5,290,886 | A | 3/1994 | Ellul ........................ 524/515 | 6,090,081 | A | 7/2000 | Sudo et al. |
| 5,308,904 | A | 5/1994 | Fujii et al. ................... 524/232 | 6,111,039 | A | 8/2000 | Miro et al. |
| 5,312,856 | A | 5/1994 | Hert et al. ................... 524/297 | 6,127,444 | A | 10/2000 | Kadri ........................ 521/139 |
| 5,324,580 | A | 6/1994 | Allan et al. ................. 442/361 | 6,143,818 | A | 11/2000 | Wang ........................ 524/528 |
| 5,340,848 | A | 8/1994 | Asanuma et al. | 6,190,769 | B1 | 2/2001 | Wang ........................ 428/342 |
| 5,356,709 | A | 10/1994 | Woo et al. ................... 428/376 | 6,191,078 | B1 | 2/2001 | Shlomo et al. |
| 5,356,948 | A | 10/1994 | Payne, Jr. et al. ............. 522/75 | 6,194,498 | B1 | 2/2001 | Anderson et al. ........... 524/168 |
| 5,356,986 | A | 10/1994 | Stewart et al. ............. 524/462 | 6,197,285 | B1 | 3/2001 | Kowalik et al. |
| 5,360,868 | A | 11/1994 | Mosier et al. | 6,207,754 | B1 * | 3/2001 | Yu ............................ 525/133 |
| 5,376,716 | A | 12/1994 | Nayak et al. ................ 524/295 | 6,231,936 | B1 | 5/2001 | Kozimor et al. ............ 428/34.7 |
| 5,389,711 | A | 2/1995 | Westbrook et al. .......... 524/288 | 6,231,970 | B1 | 5/2001 | Anderson et al. ........... 428/332 |
| 5,397,832 | A | 3/1995 | Ellul ........................ 524/515 | 6,271,294 | B1 | 8/2001 | Lasson et al. ............... 524/314 |
| 5,409,041 | A | 4/1995 | Yoshida et al. ................ 138/30 | 6,316,068 | B1 | 11/2001 | Masubuchi et al. ........ 428/35.7 |
| 5,412,020 | A | 5/1995 | Yamamoto et al. | 6,326,426 | B1 | 12/2001 | Ellul ........................ 524/290 |
| 5,424,080 | A | 6/1995 | Synosky et al. ................ 426/3 | 6,329,468 | B1 | 12/2001 | Wang ........................ 525/240 |
| 5,437,877 | A | 8/1995 | Synosky et al. ................ 426/3 | 6,337,364 | B1 | 1/2002 | Sakaki et al. ............... 524/270 |
| 5,442,004 | A | 8/1995 | Sutherland et al. .......... 524/140 | 6,342,209 | B1 | 1/2002 | Patil et al. ..................... 424/61 |
| 5,459,193 | A | 10/1995 | Anderson et al. ........... 524/505 | 6,342,320 | B2 | 1/2002 | Liu et al. ..................... 429/307 |
| 5,462,754 | A | 10/1995 | Synosky et al. ................ 426/4 | 6,342,565 | B1 | 1/2002 | Cheng et al. ................. 525/191 |
| 5,462,981 | A | 10/1995 | Bastioli et al. ................ 524/47 | 6,348,563 | B1 | 2/2002 | Fukuda et al. .............. 528/310 |
| 5,489,646 | A | 2/1996 | Tatman et al. ............. 524/84 B | 6,362,252 | B1 | 3/2002 | Prutkin ....................... 523/200 |
| 5,492,943 | A | 2/1996 | Stempel ....................... 523/111 | 6,372,379 | B1 | 4/2002 | Samii et al. ................. 429/145 |
| 5,512,625 | A | 4/1996 | Butterbach et al. .......... 524/490 | 6,380,292 | B1 | 4/2002 | Gibes et al. ................. 524/318 |
| 5,548,008 | A | 8/1996 | Asanuma et al. | 6,384,115 | B1 | 5/2002 | Van Gysel et al. .......... 524/169 |
| 5,552,482 | A | 9/1996 | Berta | 6,399,707 | B1 * | 6/2002 | Meka et al. ................. 525/191 |
| 5,563,222 | A | 10/1996 | Fukuda et al. ............... 525/347 | 6,403,692 | B1 * | 6/2002 | Traugott et al. ............. 524/451 |
| 5,569,693 | A | 10/1996 | Doshi et al. | 6,410,200 | B1 | 6/2002 | Williams et al. ............ 430/126 |
| 5,591,817 | A | 1/1997 | Asanuma et al. | 6,413,458 | B1 | 7/2002 | Pearce ........................ 264/141 |
| 5,601,858 | A | 2/1997 | Mansukhani et al. ........... 426/3 | 6,448,338 | B1 | 9/2002 | Born et al. ................... 525/193 |
| 5,614,297 | A | 3/1997 | Velazquez | 6,451,915 | B1 | 9/2002 | Ellul et al. ................... 525/191 |
| 5,624,627 | A | 4/1997 | Yagi et al. | 6,465,109 | B2 | 10/2002 | Ohtsuka ..................... 428/516 |
| 5,624,986 | A | 4/1997 | Bunnelle et al. ............. 524/270 | 6,482,281 | B1 | 11/2002 | Schmidt ..................... 156/108 |
| 5,663,230 | A | 9/1997 | Haman ........................ 524/447 | 6,498,213 | B2 | 12/2002 | Jeong et al. |
| 5,683,634 | A | 11/1997 | Fujii et al. ..................... 264/41 | 6,509,128 | B1 | 1/2003 | Everaerts et al. .............. 430/39 |
| 5,683,815 | A | 11/1997 | Leiss ........................ 428/424.4 | 6,515,231 | B1 | 2/2003 | Strobech et al. |
| 5,688,850 | A | 11/1997 | Wyffels ....................... 524/317 | 6,531,214 | B2 | 3/2003 | Carter et al. ................. 428/336 |
| 5,700,312 | A * | 12/1997 | Fausnight et al. ............. 106/10 | 6,538,066 | B2 | 3/2003 | Watanabe et al. ........... 525/184 |
| 5,726,239 | A | 3/1998 | Maes et al. .................. 524/505 | 6,559,232 | B2 | 5/2003 | Inoue et al. ................. 525/240 |
| 5,728,760 | A | 3/1998 | Rose et al. ................... 524/292 | 6,583,207 | B2 | 6/2003 | Stanhope et al. ............ 524/291 |
| 5,736,197 | A | 4/1998 | Gaveske ....................... 427/393 | 6,610,768 | B1 | 8/2003 | Jelenic et al. ................ 524/386 |
| 5,739,200 | A | 4/1998 | Cheung et al. ............... 524/504 | 6,623,847 | B2 | 9/2003 | Yates ..................... 428/314.4 |
| 5,741,840 | A | 4/1998 | Lindquist et al. ............. 524/271 | 6,632,974 | B1 | 10/2003 | Suzuki et al. |
| 5,747,573 | A | 5/1998 | Ryan ........................ 524/270 | 6,639,020 | B1 * | 10/2003 | Brant ........................ 525/240 |
| 5,776,589 | A | 7/1998 | Mace et al. | 6,642,316 | B1 | 11/2003 | Datta et al. |
| 5,783,531 | A | 7/1998 | Andrew et al. | 6,706,828 | B2 | 3/2004 | DiMaio |
| 5,786,418 | A | 7/1998 | Strelow et al. ............... 524/579 | 6,720,376 | B2 | 4/2004 | Itoh et al. |
| 5,789,529 | A | 8/1998 | Matsumura et al. .......... 528/310 | 6,730,739 | B2 | 5/2004 | Gipson ........................ 525/191 |
| 5,804,630 | A | 9/1998 | Heyer et al. ................. 524/436 | 6,753,373 | B2 | 6/2004 | Winowiecki |
| 5,837,769 | A | 11/1998 | Graafland et al. ............ 524/505 | 6,787,593 | B2 * | 9/2004 | Bell et al. ................... 524/451 |
| 5,849,806 | A | 12/1998 | St. Clair et al. ............. 521/109.1 | 6,803,415 | B1 * | 10/2004 | Mikielski et al. ............ 525/191 |
| 5,869,555 | A | 2/1999 | Simmons et al. ............. 524/229 | 6,867,253 | B1 | 3/2005 | Chen ........................ 524/505 |
| 5,869,560 | A | 2/1999 | Kobayashi et al. ............ 524/487 | 6,905,760 | B1 | 6/2005 | Mukohara et al. |
| 5,869,562 | A | 2/1999 | Lindquist et al. ............. 524/505 | 7,271,209 | B2 | 9/2007 | Li et al. |
| 5,872,183 | A | 2/1999 | Bonnet et al. ................. 525/66 | 2001/0051265 | A1 | 12/2001 | Williams et al. ............ 428/343 |
| 5,891,946 | A | 4/1999 | Nohara et al. | 2002/0049276 | A1 | 4/2002 | Zwick ........................ 524/476 |
| 5,908,412 | A | 6/1999 | Koczab et al. ............... 604/367 | 2002/0077409 | A1 | 6/2002 | Sakaki et al. ............... 524/496 |
| 5,916,953 | A * | 6/1999 | Jacoby et al. ................ 524/494 | 2002/0147266 | A1 | 10/2002 | Rawlinson et al. .......... 524/525 |
| 5,916,959 | A | 6/1999 | Lindquist et al. ............. 524/505 | 2002/0155267 | A1 | 10/2002 | Bader ........................ 428/216 |
| 5,929,147 | A | 7/1999 | Pierick et al. ................. 524/99 | 2002/0160137 | A1 | 10/2002 | Varma ........................ 428/35.7 |
| 5,939,483 | A | 8/1999 | Kueppers ..................... 524/487 | 2002/0168518 | A1 | 11/2002 | Bond et al. ................. 428/364 |
| 5,948,557 | A | 9/1999 | Ondeck et al. ................ 429/33 | 2002/0183429 | A1 | 12/2002 | Itoh et al. |
| 5,968,455 | A | 10/1999 | Brickley | 2002/0188057 | A1 | 12/2002 | Chen |
| 5,969,021 | A | 10/1999 | Reddy et al. | 2003/0004266 | A1 | 1/2003 | Kitazaki et al. ............... 525/95 |
| 6,001,455 | A * | 12/1999 | Nishio et al. ............... 428/156 | 2003/0022977 | A1 | 1/2003 | Hall |
| 6,017,986 | A | 1/2000 | Burton ........................ 524/313 | 2003/0032696 | A1 | 2/2003 | Sime et al. .................. 523/160 |
| 6,025,448 | A | 2/2000 | Swindoll et al. | 2003/0035951 | A1 | 2/2003 | Magill et al. ................ 428/373 |
| 6,027,674 | A | 2/2000 | Yates ........................ 264/113 | 2003/0036577 | A1 | 2/2003 | Hughes et al. |
| 6,042,902 | A | 3/2000 | Kuder et al. | 2003/0091803 | A1 | 5/2003 | Bond et al. ............... 428/292.1 |
| 6,045,922 | A | 4/2000 | Janssen et al. ............... 428/515 | 2003/0092826 | A1 | 5/2003 | Pearce ........................ 524/505 |
| 6,060,561 | A | 5/2000 | Wolfshwenger et al. ...... 525/159 | 2003/0134552 | A1 | 7/2003 | Mehawej et al. ............ 442/118 |
| 6,077,899 | A | 6/2000 | Yatsuyanagi et al. ........ 524/495 | 2003/0157859 | A1 | 8/2003 | Ishikawa ..................... 442/340 |

| | | | | | |
|---|---|---|---|---|---|
| 2003/0181575 A1 | 9/2003 | Schmidt et al. | EP | 0 476 401 | 3/1992 |
| 2003/0181584 A1 | 9/2003 | Handlin, Jr. et al. ............ 525/88 | EP | 0 477 748 | 4/1992 |
| 2003/0187081 A1 | 10/2003 | Cui ............................ 521/27 | EP | 0 475 700 | 11/1992 |
| 2004/0034148 A1 | 2/2004 | Kelly et al. ................. 524/474 | EP | 0 513 470 | 11/1992 |
| 2004/0054040 A1 | 3/2004 | Lin et al. | EP | 0315363 | 1/1994 |
| 2004/0063806 A1 | 4/2004 | Kaarnakari | EP | 0 407 098 | 2/1994 |
| 2004/0070653 A1 | 4/2004 | Mashita et al. ................ 347/86 | EP | 0 409 155 | 5/1994 |
| 2004/0091631 A1 | 5/2004 | Belli et al. | EP | 0 614 939 | 9/1994 |
| 2004/0106723 A1 | 6/2004 | Yang et al. .................. 524/570 | EP | 0 617 077 | 9/1994 |
| 2004/0116515 A1 | 6/2004 | Anderson et al. | EP | 0 622 432 | 11/1994 |
| 2004/0186214 A1 | 9/2004 | Li et al. ..................... 524/474 | EP | 0 428 153 | 3/1995 |
| 2004/0214498 A1 | 10/2004 | Webb et al. ................. 442/329 | EP | 0 664 315 | 7/1995 |
| 2004/0260001 A1 | 12/2004 | Lin et al. .................... 524/474 | EP | 0 677 548 | 10/1995 |
| 2004/0266948 A1 | 12/2004 | Jacob et al. | EP | 0 448 259 | 11/1995 |
| 2005/0106978 A1 | 5/2005 | Cheng et al. | EP | 0 682 074 | 11/1995 |
| 2005/0148720 A1 | 7/2005 | Li et al. | EP | 0 699 519 | 3/1996 |
| 2005/0170117 A1 | 8/2005 | Cleveland et al. | EP | 0 716 124 | 6/1996 |
| 2005/0271851 A1 | 12/2005 | Shibatou et al. | EP | 0 742 227 | 11/1996 |
| 2005/0277738 A1 | 12/2005 | Hoyweghen et al. | EP | 0 755 970 | 1/1997 |
| 2006/0008643 A1 | 1/2006 | Lin et al. | EP | 0 757 076 | 2/1997 |
| 2006/0079617 A1 | 4/2006 | Kappes et al. | EP | 0 801 104 | 10/1997 |
| 2006/0100347 A1 | 5/2006 | Ouhadi et al. | EP | 0 827 526 | 3/1998 |
| 2006/0135699 A1 | 6/2006 | Li et al. | EP | 0 886 656 | 12/1998 |
| 2006/0167184 A1 | 7/2006 | Waddell et al. | EP | 0 902 051 | 3/1999 |
| 2006/0173123 A1 | 8/2006 | Yang et al. | EP | 0 940 433 | 9/1999 |
| 2006/0189763 A1 | 8/2006 | Yang et al. | EP | 1 028 145 | 8/2000 |
| 2006/0205863 A1 | 9/2006 | Lin et al. | EP | 1028145 | 8/2000 |
| 2007/0021560 A1 | 1/2007 | Tse et al. | EP | 1 104 783 | 6/2001 |
| | | | EP | 1 138 478 | 10/2001 |

FOREIGN PATENT DOCUMENTS

| | | |
|---|---|---|
| EP | 1 201 391 | 5/2002 |
| DE | 1 282 942 | 11/1968 |
| EP | 1 211 285 | 6/2002 |
| DE | 1 961 981 | 7/1970 |
| EP | 1 214 386 | 6/2002 |
| DE | 1 669 261 | 10/1970 |
| EP | 1 252 231 | 10/2002 |
| DE | 1 921 649 | 11/1970 |
| EP | 1 028 145 | 1/2003 |
| DE | 2 019 945 | 11/1971 |
| EP | 1 331 258 | 7/2003 |
| DE | 2 108 293 | 8/1972 |
| EP | 1 342 249 | 1/2009 |
| DE | 1769723 | 10/1972 |
| FR | 1 167 244 | 11/1958 |
| DE | 26 32 957 | 1/1978 |
| FR | 1 536 425 | 7/1968 |
| DE | 32 44 499 | 6/1983 |
| FR | 1566388 | 3/1969 |
| DE | 37 35 502 | 5/1989 |
| FR | 1 580 539 | 9/1969 |
| DE | 39 11 725 | 10/1990 |
| FR | 2094870 | 2/1972 |
| DE | 44 17 191 | 8/1995 |
| FR | 2 110 824 | 6/1972 |
| DE | 37 35 502 | 5/1998 |
| FR | 2.212.382 | 7/1974 |
| DE | 198 41 303 | 3/2000 |
| FR | 2 256 207 | 12/1974 |
| DE | 19841303 | 3/2000 |
| FR | 2 272 143 | 5/1975 |
| EP | 0 039 126 | 11/1981 |
| FR | 2 590 910 | 6/1987 |
| EP | 0 083 049 | 7/1983 |
| FR | 2 602 515 | 2/1988 |
| EP | 0 087 294 | 8/1983 |
| GB | 0511320 | 6/1937 |
| EP | 0 097 969 | 1/1984 |
| GB | 0511319 | 6/1938 |
| EP | 0 046 536 | 1/1985 |
| GB | 964 845 | 7/1964 |
| EP | 0 050 548 | 1/1985 |
| GB | 1044028 | 9/1966 |
| EP | 0 058 331 | 6/1985 |
| GB | 1044502 | 10/1966 |
| EP | 0 058 404 | 1/1986 |
| GB | 1044503 | 10/1966 |
| EP | 0 210 733 | 2/1987 |
| GB | 1068783 | 5/1967 |
| EP | 0 214 112 | 3/1987 |
| GB | 1166664 | 10/1969 |
| EP | 0 217 516 | 4/1987 |
| GB | 1252638 | 11/1971 |
| EP | 0 073 042 | 10/1987 |
| GB | 1 331988 | 9/1973 |
| EP | 0 255 735 | 2/1988 |
| GB | 1329915 | 9/1973 |
| EP | 0 332 802 | 3/1988 |
| GB | 1452911 | 10/1976 |
| EP | 0 315 363 | 10/1988 |
| GB | 1458915 | 12/1976 |
| EP | 0 299 718 | 1/1989 |
| GB | 1559058 | 1/1980 |
| EP | 0 300 689 | 1/1989 |
| GB | 2 180 790 | 4/1987 |
| EP | 0300689 | 1/1989 |
| GB | 2 195 642 | 4/1988 |
| EP | 0 321 868 | 6/1989 |
| JP | 68013376 | 6/1943 |
| EP | 0 322 169 | 6/1989 |
| JP | 69029554 | 12/1966 |
| EP | 0 315 481 | 8/1989 |
| JP | 44029554 | 12/1969 |
| EP | 0 343 943 | 11/1989 |
| JP | 74-041101 | 11/1974 |
| EP | 0 369 164 | 5/1990 |
| JP | 50123148 | 9/1975 |
| EP | 0 389 695 | 10/1990 |
| JP | 50151243 | 12/1975 |
| EP | 0 407 098 | 1/1991 |
| JP | 76029170 | 3/1976 |
| EP | 0 431 475 | 6/1991 |
| JP | 53023388 | 3/1978 |
| EP | 0 448 259 | 9/1991 |
| JP | 53060383 | 5/1978 |
| | | JP | 53102381 | 9/1978 |

| | | |
|---|---|---|
| JP | 56045932 | 4/1981 |
| JP | 56095938 | 8/1981 |
| JP | 60112439 | 6/1985 |
| JP | 62132943 | 6/1987 |
| JP | 62223245 | 10/1987 |
| JP | 88033788 | 7/1988 |
| JP | 63251436 | 10/1988 |
| JP | 01016638 | 1/1989 |
| JP | 89017495 | 1/1989 |
| JP | 01066253 | 3/1989 |
| JP | 01-192365 | 8/1989 |
| JP | 01282280 | 11/1989 |
| JP | 2067344 | 3/1990 |
| JP | 03037481 | 2/1991 |
| JP | 03269036 | 11/1991 |
| JP | 04063851 | 2/1992 |
| JP | 04 214709 | 5/1992 |
| JP | 04-214709 | 8/1992 |
| JP | 04257361 | 9/1992 |
| JP | 05098088 | 4/1993 |
| JP | 05-202339 | 8/1993 |
| JP | 06-001892 | 1/1994 |
| JP | 06345893 | 12/1994 |
| JP | 07118492 | 5/1995 |
| JP | 07214685 | 8/1995 |
| JP | 07216143 | 8/1995 |
| JP | 07247387 | 9/1995 |
| JP | 95085907 | 9/1995 |
| JP | 07-292167 | 11/1995 |
| JP | 7292167 | 11/1995 |
| JP | 07292167 | 11/1995 |
| JP | 08034862 | 2/1996 |
| JP | 08246232 | 9/1996 |
| JP | 08269417 | 10/1996 |
| JP | 08333557 | 12/1996 |
| JP | 34 74677 | 1/1997 |
| JP | 09-076260 | 3/1997 |
| JP | 09-077901 | 3/1997 |
| JP | 9087435 | 3/1997 |
| JP | 09104801 | 4/1997 |
| JP | 9-208761 * | 8/1997 |
| JP | 09208761 | 8/1997 |
| JP | 9208761 | 8/1997 |
| JP | 10017693 | 1/1998 |
| JP | 10036569 | 2/1998 |
| JP | 10-168252 | 6/1998 |
| JP | 10158971 | 6/1998 |
| JP | 10279750 | 10/1998 |
| JP | 10324783 | 12/1998 |
| JP | 10325060 | 12/1998 |
| JP | 11020397 | 1/1999 |
| JP | 11-49903 * | 2/1999 |
| JP | 11-049903 | 2/1999 |
| JP | 11-49903 A * | 2/1999 |
| JP | 11060789 | 3/1999 |
| JP | 11080455 | 3/1999 |
| JP | 11239587 | 9/1999 |
| JP | 11291422 | 10/1999 |
| JP | 2000154281 | 6/2000 |
| JP | 2001064523 | 3/2001 |
| JP | 2001/106628 | 4/2001 |
| JP | 2001131509 | 5/2001 |
| JP | 2001233992 | 8/2001 |
| JP | 2001279031 | 10/2001 |
| JP | 2001342355 | 12/2001 |
| JP | 2002/038114 | 2/2002 |
| JP | 3325376 | 9/2002 |
| JP | 2004345327 | 12/2004 |
| SU | SU 455976 | 5/1975 |
| WO | 80/00028 | 1/1980 |
| WO | 89/08681 | 9/1989 |
| WO | WO 91/18045 | 11/1991 |
| WO | 92/00354 | 1/1992 |
| WO | WO 92/14784 | 9/1992 |
| WO | 92/16583 | 10/1992 |
| WO | 94/15014 | 7/1994 |
| WO | 95/13316 | 5/1995 |
| WO | 96/04419 | 2/1996 |
| WO | 96/11231 | 4/1996 |
| WO | 96/11232 | 4/1996 |
| WO | 96/26242 | 8/1996 |
| WO | 97/10298 | 3/1997 |
| WO | 97/19582 | 6/1997 |
| WO | 97/33921 | 9/1997 |
| WO | WO 98/44041 A1 * | 4/1998 |
| WO | 98/36783 | 8/1998 |
| WO | 98/44041 | 10/1998 |
| WO | 98/46694 | 10/1998 |
| WO | 99/13016 | 3/1999 |
| WO | WO 99/24501 | 5/1999 |
| WO | 99/62987 | 12/1999 |
| WO | WO 00/01745 | 1/2000 |
| WO | 00/66662 | 11/2000 |
| WO | 01/02263 | 1/2001 |
| WO | WO 01/02482 A1 * | 1/2001 |
| WO | 01/18109 | 3/2001 |
| WO | 01/43963 | 6/2001 |
| WO | 02/10310 | 2/2002 |
| WO | 02/17973 | 3/2002 |
| WO | 02/18487 | 3/2002 |
| WO | WO 02/018487 | 3/2002 |
| WO | 02/30194 | 4/2002 |
| WO | 02/31244 | 4/2002 |
| WO | WO 02/030194 | 4/2002 |
| WO | 02/062891 | 8/2002 |
| WO | 02/072689 | 9/2002 |
| WO | 02/074873 | 9/2002 |
| WO | 02/088238 | 11/2002 |
| WO | WO 02/100153 | 12/2002 |
| WO | 03/029379 | 4/2003 |
| WO | 03/48252 | 6/2003 |
| WO | 03/048252 | 6/2003 |
| WO | WO 03/048252 | 6/2003 |
| WO | 03/060004 | 7/2003 |
| WO | 03/066729 | 8/2003 |
| WO | 04/31292 | 9/2003 |
| WO | 04/009699 | 1/2004 |
| WO | 04/09699 | 1/2004 |
| WO | WO 2004/009699 | 1/2004 |
| WO | 04/014997 | 2/2004 |
| WO | WO 2004/014998 | 2/2004 |
| WO | 04/20195 | 3/2004 |
| WO | WO 2005/080495 | 9/2005 |
| WO | WO 2006/006346 | 1/2006 |
| WO | WO 2006/128467 | 12/2006 |
| WO | WO 2006/128646 | 12/2006 |

OTHER PUBLICATIONS

Dharmarajan et al. "Modifying Polypropylene with a Metallocen Plastomer" Plastics Engineering, Aug. 1996, p. 33-35.*
JP 11-049903 (Feb. 1999) abstract and translation in English.*
JP 9-208761 (Aug. 1997) abstract and translation in English.*
"Mitsui LUCANT HC-40 Synthetic Oil" product data sheet; Jun. 18, 2008.*
"Lubricants and Other Processing Aids", *Chemical Additives for the Plastics Industry, Properties, Applications, Toxicologies*, Noyes Data Corporation, Park Ridge, NJ, 1987, pp. 99-116.
Abstract of JP 8253754, published on Oct. 1, 1996, entitled, "Method for Foaming Reactive Hot-Melt Polyurethane Adhesive".
PCT Written Opinion, Jan. 7, 2004, 2002B107B.
"Swelling Interaction, Plasticization, and Antioxidant extraction Between Fiber Optic Cable Gels and Polyolefins" B. G. Risch, Ph.D., SPE-ANTEC, 1999.
"Use of "Clean " Paraffinic Processing Oils to Improve TPE Properties", B. J. Gedeon et al., TPEs, 2000, pp. 157-170.

"Plasticizing of isotactic polypropylene upon addition of hydrocarbon oils", K. Nitta et al., e-Polymers, No. 021, 2004, pp. 1-11.

"The Effect of Oil Type and Content on the Rheological, Mechanical and Thermal Properties of a Polyolefinic Based Thermoplastic Elastomer", McShane, et al. SPE-ANTEC, 2002.

Abstract of "Plasticizing Characteristics of High-Density Polyethylene" Wu et al., Suliao, 1988, 17 (4), 3-8.

Abstract of "Effect of Technological Additives on Properties of Thermoplastic vulcanizates Based on Ethylene Propylene Rubber and Polyolefins" Kanauzov et al., Kauchuk i Rezina, 2000, (4), 12-15.

Abstract of Polybutenes: a versatile modifier for plastics, J. D. Fotheringham, AddCon Asia (RAPRA), International Plastics Additives and Modifiers Conference, Singapore, Oct. 28-29, 1997.

Abstract of "Effect of Petroleum Plasticizers and Synthetic Oils on Rheological and service Properties of Polyolefins", M.D. Nasibova et al., Olefinov s Opyt. Z-dom, 1991 (14), 60-6.

"Rubber Chemicals and Additives", Rubber Technology Handbook, 1989, Werner Hoffman, Hanser Publishers, New York, pp. 294-305.

"Plasticizers", Additives for Plastics, J. Stepek. H. Daoust, 1983, Springer Verlag, New York, pp. 6-69.

"Lubricants and Other Processing Aids", Chemical Additives for the Plastics Industry, Properties, Applications, Toxicologies, Noyes Data Corporation, Park Ridge, NJ, 1987, pp. 1073116.

Khungar, S.L.; "Flexible Films of Polypropylene Plasticized with Polybutenes", Amoco Chemicals, pp. 2992-2996, 1996.

Pratt, C. F. et al.; "Control of Phase Separation and Voiding in Oil-Filled Polypropylene", Journal of Applied Polymers Science, vol. 18, pp. 3621-3631, 1974.

Nitta, K. et al.; "Plasticizing of isotactic polypropylene upon addition of hydrocarbon oils", e-Polymers, vol. 021, pp. 1-11, 2004.

Gedeon, B. et al.; "Use of "Clean" Paraffinic Processing Oils to Improve", Paralux Articles, Presented at TPEs 2000, pp. 1-10, 2000.

Stepek, J. et al.; "Additives for Plastics", Springer-Verlag, vol. 1, pp. 6-69, 1983.

Rudnick, L. et al.; "Synthetic Lubricants and High-Performance Functional Fluids", Marcel Dekker, Inc., pp. 409-411, 1999.

Jens Stehr, Investigation of the Effects of Poly($\alpha$-olefin) Plasticizers on the Properties of Elastomers, KGK, Jan./Feb. 2007, pp. 14-19 (translated from German by McElroy Translation Company.

Maier, C.; Calafut, T. (1998), Propylene - The Definitive User's Guide and Databook, (pp. 11-25 and 97-106), William Andrew Publishing/Plastics Design Library, Online version available at: http://www.knovel.com/knovel2/Toc.jsp?BookID=54&VerticalID=0.

* cited by examiner

Fig. 1 E' of Plasticized Propylene Polymers

Tan δ of Plasticized Propylene Copolymers

Tan δ of Plasticized Propylene Impact Copolymers

DSC Melting of Plasticized Metallocene Propylene Polymers

DSC Crystallization of Plasticized Metallocene Propylene Polymers

DSC Melting of Plasticized Propylene Random Copolymers

DSC Crystallization of Plasticized Propylene Random Copolymers

DSC Melting of Plasticized Propylene Impact Copolymers

DSC Crystallization of Plasticized Propylene Impact Copolymers

Shear Viscosity of Plasticized Metallocene Propylene Homopolymers

Shear Viscosity of Plasticized Propylene Random Copolymers

Shear Viscosity of Plasticized Propylene Impact Copolymers

Molecular Weight Distribution of Plasticized Propylene Homopolymers

PLASTICIZED POLYOLEFIN COMPOSITIONS

CROSS REFERENCE TO RELATED APPLICATIONS

This application claims the benefit of Provisional Application No. 60/402,665, filed Aug. 12, 2002, the disclosure of which is incorporated by reference in its entirety.

FIELD OF THE INVENTION

The present invention relates to plasticized polyolefins comprising a polyolefin and non-functionalized plasticizer such as $C_6$ to $C_{200}$ paraffins. More particularly, the present invention relates to plasticized polyolefins such as propylene polymers having improved processability and properties such as flexibility and impact resistance.

BACKGROUND OF THE INVENTION

Polyolefins are useful in any number of everyday articles. However, one drawback to many polyolefins, especially polypropylene homopolymers and copolymers, is the relatively high glass transition temperature. This characteristic makes these polyolefins brittle, especially at low temperatures. Given that there is a desire to make articles that can withstand a broad range of temperatures, there is a need to provide a polyolefin that can maintain its desirable characteristics such as high temperature performance, etc., while improving upon the impact strength and toughness. In particular, it would be advantageous to provide a propylene polymer possessing improved toughness without sacrificing its toughness and other desirable properties.

Addition of a plasticizer or other substance to a polyolefin is one option to improve such properties as impact strength and toughness. There are some disclosures towards such an end, such as U.S. Pat. Nos. 4,960,820; 4,132,698; 3,201,364; WO 02/31044; WO 01/18109 A1; and EP 0 300 689 A2. These disclosures are directed towards polyolefins and elastomers blended with functionalized plasticizers. The functionalized plasticizers are materials such as mineral oils which contain aromatic groups, and high (greater than $-20°$ C.) pour point compounds. Use of these compounds typically does not preserve the transparency of the polyolefin, and impact strength is often not improved.

Other background references include EP 0 448 259 A, EP 1 028 145 A, U.S. Pat. Nos. 4,073,782, and 3,415,925.

What is needed is a plasticized polyolefin with improved softness, better flexibility (lower flexural modulus), a depressed glass transition temperature, and improved impact strength (improved Gardner impact) at low temperatures (below 0° C.), while not influencing the melting temperature of the polyolefin, the polyolefin crystallization rate, its clarity, and with minimal migration of the plasticizer to the surface of articles made therefrom. Further, there is a need for a plasticized polypropylene that can be used in such applications as food containers and toys.

It would be particularly desirable to plasticize polyolefins by using a simple, non-reactive compound such as a paraffin. However, it has been taught that aliphatic or paraffinic compounds would impair the properties of polyolefins, and was thus not recommended. (See, e.g., CHEMICAL ADDITIVES FOR PLASTICS INDUSTRY 107–116 (Radian Corp., Noyes Data Corporation, NJ 1987); WO 01/18109 A1). The inventors of the present invention have found, surprisingly, that paraffinic compounds are useful plasticizers for polyolefins. The present invention is directed towards such a plasticized polyolefin.

SUMMARY OF THE INVENTION

The present invention relates to plasticized polyolefin compositions comprising a polyolefin and a non-functionalized plasticizer; wherein the non-functionalized plasticizer may comprise $C_6$ to $C_{200}$ paraffins (including branched and normal paraffins) having a pour point of less than $-5°$ C. In one embodiment, the non-functionalized plasticizer is an isoparaffin comprising $C_6$ to $C_{25}$ isoparaffins. In another embodiment the non-functionalized plasticizer is a polyalphaolefin comprising $C_{10}$ to $C_{100}$ n-paraffins. The polyolefin may be a polypropylene homopolymer, copolymer, impact copolymer, or blends thereof, and may include a plastomer. Non-limiting examples of desirable articles of manufacture made from compositions of the invention include films, sheets, fibers, woven and nonwoven fabrics, tubes, pipes, automotive components, furniture, sporting equipment, food storage containers, transparent and semi-transparent articles, toys, tubing and pipes, and medical devices. The compositions of the invention may be characterized by having an improved (decreased) $T_g$ relative to the starting polyolefin, while maintaining other desirable properties.

DETAILED DESCRIPTION OF THE INVENTION

Figure 1:
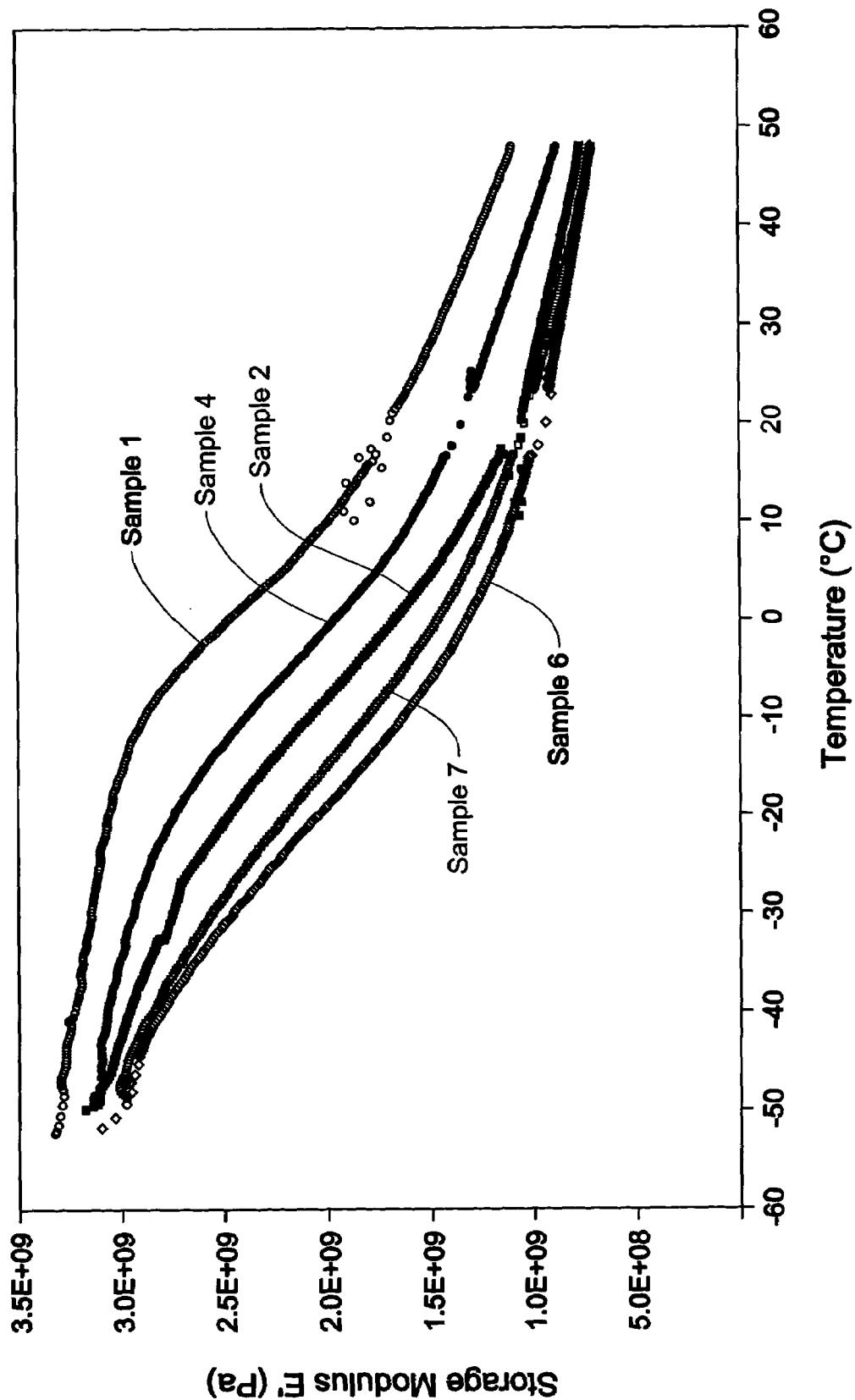
FIG. 1 is a graphical representation of the Storage Modulus (E') as a function of temperature for various plasticized propylene homopolymer examples cited herein.

The present invention is a plasticized polyolefin composition comprising a polyolefin and a non-functionalized plasticizer (NFP). The NFP may be an aliphatic hydrocarbon, or paraffin, typically comprising $C_6$ to $C_{200}$ paraffins. The term "paraffins", as used herein, includes all isomers of $C_6$ to $C_{200}$ paraffins including branched and linear structures, and blends thereof. The individual paraffins may include saturated cyclic hydrocarbons. Desirably, the NFP has a pour point of less than 0° C., and a viscosity (ASTM D445–97) of from 0.1 to 3000 cSt at 100° C. Useful NFPs may include so called polyalphaolefins (PAOs) and isoparaffins.

Certain compositions of the present invention can be characterized in that the glass transition temperature ($T_g$) of the composition decreases by at least 2° C. for every 4 wt % of NFP present in the composition in one embodiment; and decreases by at least 3° C. for every 4 wt % of NFP present in the composition in another embodiment; and decreases from at least 4 to 10° C. for every 4 wt % of NFP present in the composition in yet another embodiment, while the melting and crystallization temperatures of the polyolefin remain constant (within 1 to 2° C.). Further, the compositions of the invention are characterized in that the NFP is compatible and miscible with propylene polymers and does not form a separate phase. This is evidenced by, for example, the $T_g$ profile observed for the compositions by DMTA (Dynamic Mechanical Thermal Analysis).

The polyolefin and NFP can be blended by any suitable means. For example, they may be blended in a tumbler, an extruder, or a combination thereof. The enhanced properties of the plasticized polyolefin compositions described herein are useful in any number of applications, including transparent components such as in cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important. Any number of techniques can be used to process the plasticized polyolefins of the invention to form these articles including injection molding, extrusion, thermoforming, blow molding, rotomolding, spunbonding, meltblowing, fiber spinning, blown film, stretching for oriented films, and other common processing methods.

The invention is described further below with respect to the polyolefin, the NFP, and embodiments therein.

Polyolefin

Polyolefins may be plasticized, or blended with, the NFP of the present invention to form more flexible, yet impact resistant, compositions. In one aspect of the invention, the polyolefin is selected from polypropylene homopolymer, polypropylene copolymers, and blends thereof. The homopolymer may be atactic polypropylene, isotactic polypropylene, syndiotactic polypropylene and blends thereof. The copolymer can be a random copolymer, a block copolymer, and blends thereof. In particular, polymer blends include so called impact copolymers, elastomers and plastomers, any of which may be physical blends or in situ blends of polypropylene and polypropylene copolymer. The method of making the polypropylene is not critical, as it can be made by slurry, solution, or gas phase processes, and by using either Ziegler-Natta-type catalysts, metallocene-type catalysts, or a combination thereof. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al., *Selectivity in Propene Polymerization with Metallocene Catalysts,* 100 CHEM. REV. 1253–1345 (2000); and I, II METALLOCENE-BASED POLYOLEFINS (Wiley & Sons 2000).

The polyolefin may be a propylene homopolymer. A desirable propylene homopolymer has a molecular weight distribution (Mw/Mn) ranging from 1.5 to 10, and from 2.0 to 7 in another embodiment, and from 2.0 to 5 in yet another embodiment, and from 2.0 to 4 in yet another embodiment. The Gardner impact strength, tested on 0.125 inch disk at 23° C., of the propylene homopolymer may range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus of the propylene homopolymer ranges from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C., 2.16 kg) of propylene homopolymer ranges from 0.1 dg/min to 2500 dg/min in one embodiment, and from 0.3 to 500 dg/min in another embodiment.

The polypropylene homopolymer or copolymer useful in the present invention may have some level of isotacticity. Thus, in one embodiment, isotactic polypropylene is a useful polyolefin, and highly isotactic polypropylene in another embodiment. As used herein, "isotactic" is defined as having at least 10% isotactic pentads according to analysis by $^{13}$C-NMR. As used herein, "highly isotactic" is defined as having at least 60% isotactic pentads according to analysis by $^{13}$C-NMR. In a desirable embodiment, a polypropylene homopolymer having at least 85% isotacticity is the polyolefin, and at least 90% isotacticity in yet another embodiment.

In another embodiment of the invention, the polyolefin is a propylene copolymer, either random, or block, of propylene derived units and units selected from ethylene and $C_4$ to $C_{20}$ α-olefin derived units, and from ethylene and $C_4$ to $C_{10}$ α-olefin derived units in another embodiment. The ethylene or $C_4$ to $C_{20}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_4$ to $C_{20}$ α-olefin derived units in any combination of any upper wt % limit with any lower wt % limit described herein. The propylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 in yet another embodiment, wherein a desirable copolymer may comprise any upper molecular weight limit with any lower molecular weight limit described herein.

In yet another embodiment, the Gardner impact strength, tested on 0.125 inch disk at 23° C., of the propylene copolymer ranges from 20 in-lb to 1000 in-lb, and from 30 in-lb to 500 in-lb in another embodiment, and from 40 in-lb to 400 in-lb in yet another embodiment. Further, the propylene copolymer may possess a 1% secant flexural modulus ranging from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C.) of desirable copolymers ranges from 0.1 dg/min to 2500 dg/min in one embodiment, and from 0.1 to 500 dg/min in another embodiment.

In another embodiment, the polyolefin may be a so called "impact copolymer" or block copolymer. This impact copolymer may be a reactor blend (in situ blend) or a physical blend. In one embodiment, a suitable impact copolymer comprises from 40% to 95% by weight Component A and from 5% to 60% by weight Component B based on the total weight of the impact copolymer; wherein Component A comprises propylene homopolymer or copolymer, the copolymer comprising 10% or less by weight ethylene, butene, hexene or octene comonomer; and wherein Component B comprises propylene copolymer, wherein the copolymer comprises from 5% to 70% by weight ethylene, butene, hexene and/or octene comonomer, and from about 95% to about 30% by weight propylene. In one embodiment of the impact copolymer, Component B consists essentially of propylene and from about 30% to about 65% by weight ethylene. In another embodiment, Component B comprises ethylene-propylene copolymers, ethylene-propylene-diene terpolymers, ethylene-acrylate copolymers, ethylenevinyl acetate, styrene-butadiene copolymers, ethylene-acrylic ester copolymers, polybutadiene, polyisoprene, natural rubber, isobutylene, hydrocarbon resin (being characterized by a molecular weight less than 5000, a $T_g$ of about 50 to 100° C. and a softening point less than about 140° C.), rosin, and mixtures thereof. In another embodiment, Component B has a molecular weight distribution of less than 3.5. In yet another embodiment, Component B has a weight average molecular weight of at least 20,000. A useful impact copolymer is disclosed in, for example, U.S. Pat. Nos. 6,342,566 and 6,384,142.

In yet another embodiment, the Gardner impact strength, tested on 0.125 inch disk at −29° C., of the propylene impact copolymer ranges from 20 in-lb to 1000 in-lb, and from 30 in-lb to 500 in-lb in another embodiment, and from 40 in-lb to 400 in-lb in yet another embodiment. Further, the 1% secant flexural modulus of the propylene impact copolymer may range from 100 MPa to 2300 MPa in one embodiment, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C., 2.16 kg) of desirable homopolymers ranges from 0.1 dg/min to 2500 dg/min in one embodiment, and from 0.3 to 500 dg/min in another embodiment.

Another suitable polyolefin comprises a blend of a polypropylene homopolymer or copolymer with a so called "plastomer". The plastomers that are useful in the present invention may be described as polyolefin copolymers having a density of from 0.85 to 0.915 g/cm$^3$ and a melt index (MI) between 0.10 and 30 dg/min (ASTM D 1238; 190° C., 2.1 kg). In one embodiment, the useful plastomer is a copolymer of ethylene derived units and at least one of $C_3$ to $C_{10}$ α-olefin derived units, the copolymer having a density in the range of less than 0.915 g/cm$^3$. The amount of comonomer ($C_3$ to $C_{10}$ α-olefin derived units) present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer useful in the invention has a melt index (MI) of between 0.10 and 20 dg/min in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus (ASTM D 790) of useful plastomers ranges from 10 MPa to 150 MPa in one embodiment, and from 20 MPa to 100 MPa in another embodiment. Further, the plastomer that is useful in compositions of the present invention has a melting temperature ($T_m$) of from 30 to 80° C. (first melt peak) and from 50 to 125° C. (second melt peak) in one embodiment, and from 40 to 70° C. (first melt peak) and from 50 to 100° C. (second melt peak) in another embodiment.

Plastomers useful in the present invention are metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The molecular weight distribution (Mw/Mn) of desirable plastomers ranges from 1.5 to 5 in one embodiment, and from 2.0 to 4 in another embodiment. Examples of a commercially available plastomers are EXACT 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

The polyolefin suitable for use in the present invention can be in any physical form when used to blend with the NFP of the invention. In one embodiment, reactor granules, defined as the granules of polymer that are isolated from the polymerization reactor prior to any processing procedures, are used to blend with the NFP of the invention. The reactor granules have an average diameter of from 50 μm to 10 mm in one embodiment, and from 10 μm to 5 mm in another embodiment. In another embodiment, the polyolefin is in the form of pellets, such as, for example, having an average diameter of from 1 mm to 10 mm that are formed from melt extrusion of the reactor granules.

In one embodiment of the invention, the polyolefin suitable for the composition excludes physical blends of polypropylene with other polyolefins, and in particular, excludes physical blends of polypropylene with low molecular weight (500 to 10,000 g/mol) polyethylene or polyethylene copolymers, meaning that, low molecular weight polyethylene or polyethylene copolymers are not purposefully added in any amount to the polyolefin (e.g., polypropylene homopolymer or copolymer) compositions of the invention, such as is the case in, for example, WO 01/18109 A1.

The polyolefin is present in the compositions of the present invention from 40 wt % to 99.9 wt % in one embodiment, and from 50 wt % to 99 wt % in another embodiment, and from 60 wt % to 98 wt % in yet another embodiment, and from 70 wt % to 97 wt % in yet another embodiment, and from 80 wt % to 97 wt % in yet another embodiment, and from 90 wt % to 98 wt % in yet another embodiment, wherein a desirable range may be any combination of any upper wt % limit with any lower wt % limit described herein.

Desirable polyolefins for use in the present invention may thus be described by any embodiment herein, or any combination of the embodiments described herein.

Non-functionalized Plasticizer

The polyolefin compositions of the present invention include a non-functionalized plastizer ("NFP"). The NFP of the present invention is a compound comprising carbon and hydrogen, and does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added to the NFP, and if present at all, are present to less than 5 wt % by weight of the NFP in one embodiment, and less than 1 wt % in another embodiment, and less than 0.5 wt % in yet another embodiment.

In one embodiment, the NFP consists of $C_6$ to $C_{200}$ paraffins, and $C_8$ to $C_{100}$ paraffins in another embodiment. In another embodiment, the NFP consists essentially of $C_6$ to $C_{200}$ paraffins, and consists essentially of $C_8$ to $C_{100}$ paraffins in another embodiment. For purposes of the present invention and description herein, the term "paraffin" includes all isomers such as n-paraffins, branched paraffins, isoparaffins, and may include cyclic aliphatic species, and blends thereof, and may be derived synthetically by means known in the art, or from refined crude oil in such a way as to meet the requirements described for desirable NFPs described herein. It will be realized that the classes of materials described herein that are useful as an NFPs can be utilized alone or admixed with other NFPs described herein in order to obtain the desired properties.

The NFP may be present in the polyolefin compositions of the invention from 0.1 wt % to 60 wt % in one embodiment, and from 0.5 wt % to 40 wt % in another embodiment, and from 1 wt % to 20 wt % in yet another embodiment, and from 2 wt % to 10 wt % in yet another embodiment, wherein a desirable range may comprise any upper wt % limit with any lower wt % limit described herein.

The NFP may also be described by any number of, or any combination of, parameters described herein. In one embodiment, the NFP of the present invention has a pour point (ASTM D97) of from less than 0° C. in one embodiment, and less than −5° C. in another embodiment, and less than −10° C. in another embodiment, less than −20° C. in yet another embodiment, less than −40° C. in yet another embodiment, less than −50° C. in yet another embodiment, and less than −60° C. in yet another embodiment, and greater than −120° C. in yet another embodiment, and greater than −200° C. in yet another embodiment, wherein a desirable range may include any upper pour point limit with any lower pour point limit described herein. In one embodiment, the NFP is a paraffin or other compound having a pour point of less than −30° C., and between −30° C. and −90° C. in another embodiment, in the viscosity range of from 0.5 to 200 cSt at 40° C. (ASTM D445-97). Most mineral oils, which typically include aromatic moieties and other functional groups, have a pour point of from 10° C. to −20° C. at the same viscosity range.

The NFP may have a dielectric constant at 20° C. of less than 3.0 in one embodiment, and less than 2.8 in another embodiment, less than 2.5 in another embodiment, and less than 2.3 in yet another embodiment, and less than 2.1 in yet another embodiment. Polyethylene and polypropylene each have a dielectric constant (1 kHz, 23° C.) of at least 2.3 (CRC HANDBOOK OF CHEMISTRY AND PHYSICS (David R. Lide, ed. 82 ed. CRC Press 2001).

The NFP has a viscosity (ASTM D445-97) of from 0.1 to 3000 cSt at 100° C., and from 0.5 to 1000 cSt at 100° C. in another embodiment, and from 1 to 250 cSt at 100° C. in another embodiment, and from 1 to 200 cSt at 100° C. in yet another embodiment, and from 10 to 500 cSt at 100° C. in yet another embodiment, wherein a desirable range may comprise any upper viscosity limit with any lower viscosity limit described herein.

The NFP has a specific gravity (ASTM D 4052, 15.6/15.6° C.) of less than 0.920 g/cm³ in one embodiment, and less than 0.910 g/cm³ in another embodiment, and from 0.650 to 0.900 g/cm³ in another embodiment, and from 0.700 to 0.860 g/cm³, and from 0.750 to 0.855 g/cm³ in another embodiment, and from 0.790 to 0.850 g/cm³ in another embodiment, and from 0.800 to 0.840 g/cm³ in yet another embodiment, wherein a desirable range may comprise any upper specific gravity limit with any lower specific gravity limit described herein. The NFP has a boiling point of from 100° C. to 800° C. in one embodiment, and from 200° C. to 600° C. in another embodiment, and from 250° C. to 500° C. in yet another embodiment. Further, the NFP has a weight average molecular weight (GPC or GC) of less than 20,000 g/mol in one embodiment, and less than 10,000 g/mol in yet another embodiment, and less than 5,000 g/mol in yet another embodiment, and less than 4,000 g/mol in yet another embodiment, and less than 2,000 g/mol in yet another embodiment, and less than 500 g/mol in yet another embodiment, and greater than 100 g/mol in yet another embodiment, wherein a desirable molecular weight range can be any combination of any upper molecular weight limit with any lower molecular weight limit described herein.

A compound suitable as an NFP for polyolefins of the present invention may be selected from commercially available compounds such as so called "isoparaffins", "polyalphaolefins" (PAOs) and "polybutenes" (a subgroup of PAOs). These three classes of compounds can be described as paraffins which can include branched, cyclic, and normal structures, and blends thereof. These NFPs can be described as comprising $C_6$ to $C_{200}$ paraffins in one embodiment, and $C_8$ to $C_{100}$ paraffins in another embodiment.

The so called "isoparaffins" are described as follows. These paraffins are desirably isoparaffins, meaning that the paraffin chains possess $C_1$ to $C_{10}$ alkyl branching along at least a portion of each paraffin chain. The $C_6$ to $C_{200}$ paraffins may comprise $C_6$ to $C_{25}$ isoparaffins in one embodiment, and $C_8$ to $C_{20}$ isoparaffins in another embodiment.

More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, and between 10 and 24 in another embodiment, and from 10 to 15 in yet another embodiment. Various isomers of each carbon number will typically be present. The isoparaffins may also include cycloparaffins with branched side chains, generally as a minor component of the isoparaffin. The density (ASTM 4052, 15.6/15.6° C.) of these isoparaffins ranges from 0.70 to 0.83 g/cm³; a pour point of below −40° C. in one embodiment, and below −50° C. in another embodiment; a viscosity (ASTM 445, 25° C.) of from 0.5 to 20 cSt at 25° C.; and average molecular weights in the range of 100 to 300 g/mol. The isoparaffins are commercially available under the tradename ISOPAR (ExxonMobil Chemical Company, Houston Tex.), and are described in, for example, U.S. Pat. Nos. 6,197,285, 3,818,105 and 3,439,088, and sold commercially as ISOPAR series of isoparaffins, some of which are summarized in Table 1 below.

TABLE 1

ISOPAR Series Isoparaffins

| name | distillation range (° C.) | pour point (° C.) | Avg. Specific Gravity (g/cm$^3$) | Viscosity @ 25° C. (cSt) | saturates and aromatics (wt %) |
|---|---|---|---|---|---|
| ISOPAR E | 117–136 | −63 | 0.72 | 0.85 | <0.01 |
| ISOPAR G | 161–176 | −57 | 0.75 | 1.46 | <0.01 |
| ISOPAR H | 178–188 | −63 | 0.76 | 1.8 | <0.01 |
| ISOPAR K | 179–196 | −60 | 0.76 | 1.85 | <0.01 |
| ISOPAR L | 188–207 | −57 | 0.77 | 1.99 | <0.01 |
| ISOPAR M | 223–254 | −57 | 0.79 | 3.8 | <0.01 |
| ISOPAR V | 272–311 | −63 | 0.82 | 14.8 | <0.01 |

In another embodiment, the isoparaffins are a mixture of branched and normal paraffins having from 6 to 50 carbon atoms, and from 10 to 24 carbon atoms in another embodiment, in the molecule. The isoparaffin composition has an a branch paraffin:n-paraffin ratio ranging from 0.5:1 to 9:1 in one embodiment, and from 1:1 to 4:1 in another embodiment. The isoparaffins of the mixture in this embodiment contain greater than 50 wt % (by total weight of the isoparaffin composition) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like, based on the total weight of isoparaffins in the mixture. In one embodiment, the isoparaffins of the mixture contain greater than 70 wt % of the mono-methyl species, based on the total weight of the isoparaffins in the mixture. The isoparaffinic mixture boils within a range of from 100° C. to 350° C. in one embodiment, and within a range of from 110° C. to 320° C. in another embodiment. In preparing the different grades, the paraffinic mixture is generally fractionated into cuts having narrow boiling ranges, for example, 35° C. boiling ranges. These branch paraffin/n-paraffin blends are described in, for example, U.S. Pat. No. 5,906,727.

Other suitable isoparaffins are also commercial available under the trade names SHELLSOL (by Shell), SOLTROL (by Chevron Phillips) and SASOL (by Sasol Limited). SHELLSOL is a product of the Royal Dutch/Shell Group of Companies, for example Shellsol TM (boiling point=215–260° C.). SOLTROL is a product of Chevron Phillips Chemical Co. LP, for example SOLTROL 220 (boiling point=233–280° C.). SASOL is a product of Sasol Limited (Johannesburg, South Africa), for example SASOL LPA-210, SASOL-47 (boiling point=238–274° C.).

The paraffins suitable as the NFP of the invention also include so called PAOs, which are described as follows. The PAOs useful in the present invention comprise $C_6$ to $C_{200}$ paraffins, and $C_{10}$ to $C_{100}$ n-paraffins in another embodiment. The PAOs are dimers, trimers, tetramers, pentamers, etc. of $C_4$ to $C_{12}$ α-olefins in one embodiment, and $C_5$ to $C_{12}$ α-olefins in another embodiment. Suitable olefins include 1-butene, 1-pentene, 1-hexene, 1-heptene, 1-octene, 1-nonene, 1-decene, 1-undodecene and 1-dodecene. In one embodiment, the olefin is 1-decene, and the NFP is a mixture of dimers, trimers, tetramers and pentamers (and higher) of 1-decene. The PAOs are described more particularly in, for example, U.S. Pat. Nos. 5,171,908, and 5,783,531 and in SYNTHETIC LUBRICANTS AND HIGH-PERFORMANCE FUNCTIONAL FLUIDS 1–52 (Leslie R. Rudnick & Ronald L. Shubkin, ed. Marcel Dekker, Inc. 1999).

The PAOs of the present invention possess a weight average molecular weight of from 100 to 20,000 in one embodiment, and from 200 to 10,000 in another embodiment, and from 200 to 7,000 in yet another embodiment, and from 200 to 2,000 in yet another embodiment, and from 200 to 500 in yet another embodiment. Generally, PAOs have viscosities in the range of 0.1 to 150 cSt at 100° C., and from 0.1 to 3000 cSt at 100° C. in another embodiment (ASTM 445). The PAOs useful in the present invention have pour points of less than 0° C. in one embodiment, less than −10° C. in another embodiment, and less than −20° C. in yet another embodiment, and less than −40° C. in yet another embodiment. Desirable PAOs are commercially available as SHF and SuperSyn PAOs (ExxonMobil Chemical Company, Houston Tex.), some of which are summarized in the Table 2 below.

TABLE 2

SHF and SuperSyn Series Polyalphaolefins

| PAO | specific gravity (g/cm$^3$; 15.6/15.6° C.) | Viscosity @ 100° C., cSt | VI | Pour Point, ° C. |
|---|---|---|---|---|
| SHF-20 | 0.798 | 1.68 | — | −63 |
| SHF-21 | 0.800 | 1.70 | — | −57 |
| SHF-23 | 0.802 | 1.80 | — | −54 |
| SHF-41 | 0.818 | 4.00 | 123 | −57 |
| SHF-61/63 | 0.826 | 5.80 | 133 | −57 |
| SHF-82/83 | 0.833 | 7.90 | 135 | −54 |
| SHF-101 | 0.835 | 10.0 | 136 | −54 |
| SHF-403 | 0.850 | 40.0 | 152 | −39 |
| SHF-1003 | 0.855 | 107 | 179 | −33 |
| SuperSyn 2150 | 0.850 | 150 | 214 | −42 |
| SuperSyn 2300 | 0.852 | 300 | 235 | −30 |
| SuperSyn 21000 | 0.856 | 1,000 | 305 | −18 |
| SuperSyn 23000 | 0.857 | 3,000 | 388 | −9 |

Polybutenes, a subset of PAOs, are another useful NFP of the present invention and are described as follows. In one embodiment of the invention, the polybutene processing oil is a low molecular weight (less than 15,000 number average molecular weight; less than 60,000 weight average molecular weight) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS 357–392 (Leslie R. Rudnick & Ronald L. Shubkin, ed., Marcel Dekker 1999) (hereinafter "polybutene processing oil" or "polybutene").

Described yet another way, the polybutene is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils useful in the invention typically have a number average molecular weight (Mn) of less than 10,000 g/mol in one embodiment, less than 8000 g/mol in another embodiment, and less than 6000 g/mol in yet another embodiment. In one embodiment, the polybutene oil has a number average molecular weight of greater than 400 g/mol, and greater than 700 g/mol in another embodiment, and greater than 900 g/mol in yet another embodiment. A preferred embodiment can be a combination of any lower molecular weight limit with any upper molecular weight limit described herein. For example, in one embodiment of the polybutene of the invention, the polybutene has a number average molecular weight of from 400 g/mol to 10,000 g/mol, and from 700 g/mol to 8000 g/mol in another embodiment, and from 900 g/mol to 3000 g/mol in yet another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of polybutenes are the PARAPOL™ Series of processing oils (Infineum, Linden, N.J.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment; the pour points of these polybutenes are less than 25° C. in one embodiment, less than 0° C. in another embodiment, and less than −10° C. in yet another embodiment, and between −80° C. and 25° C. in yet another embodiment; and densities (IP 190/86 at 20° C.) range from 0.79 to 0.92 g/cm$^3$, and from 0.81 to 0.90 g/cm$^3$ in another embodiment.

Below, Table 3 shows some of the properties of the PARAPOL™ oils useful in embodiments of the present invention, wherein the viscosity was determined as per ASTM D445-97, and the number average molecular weight ($M_n$) by gel permeation chromatography.

TABLE 3

| PARAPOL ™ Grades of polybutenes | | |
|---|---|---|
| Grade | $M_n$ | Viscosity @ 100° C., cSt |
| 450 | 420 | 10.6 |
| 700 | 700 | 78 |
| 950 | 950 | 230 |
| 1300 | 1300 | 630 |

TABLE 3-continued

| PARAPOL ™ Grades of polybutenes | | |
|---|---|---|
| Grade | $M_n$ | Viscosity @ 100° C., cSt |
| 2400 | 2350 | 3200 |
| 2500 | 2700 | 4400 |

Desirable NFPs for use in the present invention may thus be described by any embodiment described herein, or any combination of the embodiments described herein. For example, in one embodiment, the NFP is a $C_6$ to $C_{200}$ paraffin having a pour point of less than 25° C. Described another way, the NFP comprises an aliphatic hydrocarbon having a viscosity of from 0.1 to 1000 cSt at 100° C. Described yet another way, the NFP is selected from n-paraffins, branched isoparaffins, and blends thereof having from 8 to 25 carbon atoms. The NFP is characterized in one embodiment in that, when blended with the polyolefin to form a plasticized composition, the NFP is compatible and miscible with the propylene polymer and does not form a separate phase.

In one embodiment of compositions of the present invention, conventional plasticizers such as is commonly used for poly(vinyl chloride) are substantially absent. In particular, plasticizers such as phthalates, adipates, trimellitate esters, polyesters, and other functionalized plasticizers as disclosed in, for example U.S. Pat. Nos. 3,318,835; 4,409,345; WO 02/31044 A1; and PLASTICS ADDITIVES 499–504 (Geoffrey Pritchard, ed., Chapman & Hall 1998) are substantially absent. By "substantially absent", it is meant that these compounds are not added deliberately to the compositions.

Oils such as naphthenic and other aromatic containing oils are present to less than 0.5 wt % of the compositions of the invention in a further embodiment. Also, aromatic moieties and carbon-carbon unsaturation are substantially absent from the non-functionalized plasticizers used in the present invention in yet another embodiment. Aromatic moieties include a compound whose molecules have the ring structure characteristic of benzene, naphthalene, phenanthrene, anthracene, etc. By "substantially absent", it is meant that these aromatic compounds or moieties are not added deliberately to the compositions, and if present, are present to less than 0.5 wt % of the composition of the NFP. Thus, most "mineral oils" are substantially absent from the compositions of the present invention.

In another embodiment of compositions of the present invention, conventional plasticizers, elastomers, or "compatibilizers" such as low molecular weight polyethylene are substantially absent. In particular, polyethylene homopolymer and copolymer having a weight average molecular weight of from 500 to 10,000 is substantially absent. Such polyethylene compatibilizers are disclosed in, for example, WO 01/18109 A1. By "substantially absent", it is meant that these compounds are not added deliberately to the compositions.

Blending and Articles of Manufacture

The polyolefin compositions of the present invention may also contain other additives. Those additives include antioxidants, nucleating agents, acid scavengers, stabilizers, anticorrosion agents, blowing agents, other UV absorbers such as chain-breaking antioxidants, etc., quenchers, antistatic agents, slip agents, pigments, dyes and fillers and cure agents such as peroxide. Dyes and other colorants common in the industry may be present from 0.01 to 10 wt % in one embodiment, and from 0.1 to 6 wt % in another embodiment. Suitable nucleating agents are disclosed by, for example, H. N. Beck in

*Heterogeneous Nucleating Agents for Polypropylene Crystallization*, 11 J. APPLIED POLY. SCI. 673–685 (1967) and in *Heterogeneous Nucleation Studies on Polypropylene*, 21 J. POLY. SCI.: POLY. LETTER 347–351 (1983). Examples of suitable nucleating agents are sodium benzoate, sodium 2,2'-methylenebis(4,6-di-tert-butylphenyl) phosphate, aluminum 2,2'-methylenebis(4,6-di-tert-butylphenyl) phosphate, dibenzylidene sorbitol, di(p-tolylidene) sorbitol, di(p-ethylbenzylidene) sorbitol, bis(3,4-dimethylbenzylidene) sorbitol, and N',N'-dicyclohexyl-2,6-naphthalenedicarboxamide, and salts of disproportionated rosin esters. The foregoing list is intended to be illustrative of suitable choices of nucleating agents for inclusion in the subject polypropylene formulations.

In particular, antioxidants and stabilizers such as organic phosphites, hindered amines, and phenolic antioxidants may be present in the polyolefin compositions of the invention from 0.001 to 2 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl) phosphite (IRGAFOS 168) and di(2,4-ditert-butylphenyl) pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.1 to 50 wt % in one embodiment, and from 0.1 to 25 wt % of the composition in another embodiment, and from 0.2 to 10 wt % in yet another embodiment. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the NFP of the invention pre-contacted, or pre-absorbed into the filler prior to addition to the polyolefin in one embodiment.

More particularly, in one embodiment of the present invention, the NFP, or some portion of the NFP, may be blended with a filler, desirably a porous filler. The NFP and filler may be blended by, for example, a tumbler or other wet blending apparatus. The NFP and filler in this embodiment are blended for a time suitable to form a homogenous composition of NFP and filler, desirably from 1 minute to 5 hours in one embodiment. This NFP/filler blend may then be blended with the polyolefin useful in the invention in order to effectuate plastication of the polyolefin. In another embodiment, a porous filler may be contacted with the NFP, or some portion thereof, prior to contacting the filler with the polyolefin. In another embodiment, the porous filler, polyolefin and NFP are contacted simultaneously (or in the same blending apparatus). In any case, the NFP may be present from 0.1 to 60 wt % of the composition, and from 0.2 to 40 wt % in another embodiment, and from 0.3 to 20 wt % in yet another embodiment.

Fatty acid salts may also be present in the polyolefin compositions of the present invention. Such salts may be present from 0.001 to 1 wt % of the composition in one embodiment, and from 0.01 to 0.8 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Preferable fatty acid salts are selected from magnesium stearate, calcium stearate, sodium stearate, zinc stearate, calcium oleate, zinc oleate, and magnesium oleate.

The resultant plasticized polyolefin of the present invention may be processed by any suitable means such as by calendering, casting, coating, compounding, extrusion, foamed, laminated, blow molding, compression molding, injection molding, thermoforming, transfer molding, cast molding, rotational molding, casting such as for films, spun or melt bonded such as for fibers, or other forms of processing such as described in, for example, PLASTICS PROCESSING (Radian Corporation, Noyes Data Corp. 1986). More particularly, with respect to the physical process of producing the blend, sufficient mixing should take place to assure that a uniform blend will be produced prior to conversion into a finished product.

More particularly, the components of the polyolefinic composition of the present invention may be blended by any suitable means to form the plasticized polyolefin, which is then suitable for further processing into useful articles. In one aspect of the invention, the polyolefin and NFP are blended, or melt blended, in an apparatus such as an extruder or Brabender mixer. The polyolefin may also be blended with the NFP using a tumbler, double-cone blender, ribbon blender, or other suitable blender. In yet another embodiment, the polyolefin and NFP are blended by a combination of, for example, a tumbler, followed by melt blending in an extruder. Extrusion technology for polypropylene is described in more detail in, for example, PLASTICS EXTRUSION TECHNOLOGY 26–37 (Friedhelm Hensen, ed. Hanser Publishers 1988) and in POLYPROPYLENE HANDBOOK 304–348 (Edward P. Moore, Jr. ed., Hanser Publishers 1996).

The polyolefin suitable for use in the present invention can be in any physical form when used to blend with the NFP of the invention. In one embodiment, reactor granules, defined as the granules of polymer that are isolated from the polymerization reactor, are used to blend with the NFP of the invention. The reactor granules have an average diameter of from 10 μm to 5 mm, and from 50 μm to 10 mm in another embodiment. Alternately, the polyolefin is in the form of pellets, such as, for example, having an average diameter of from 1 mm to 6 mm that are formed from melt extrusion of the reactor granules.

One method of blending the NFP with the polyolefin is to contact the components in a tumbler, the polyolefin being in the form of reactor granules. This works particularly well with polypropylene homopolymer. This can then be followed, if desired, by melt blending in an extruder. Another method of blending the components is to melt blend the polyolefin pellets with the NFP directly in an extruder or Brabender.

Thus, in the cases of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polyolefinic compositions of the present invention are suitable for such articles as automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

These devices may be made or formed by any useful forming means for forming polyolefins. This will include, at least, molding including compression molding, injection molding, blow molding, and transfer molding; film blowing or casting; extrusion, and thermoforming; as well as by lamination, pultrusion, protrusion, draw reduction, rotational molding, spinbonding, melt spinning, melt blowing; or combinations thereof. Use of at least thermoforming or film applications allows for the possibility of and derivation of benefits from uniaxial or biaxial orientation of the radiation tolerant material.

In one embodiment, the present invention is a plasticized polyolefin composition comprising from 99.9 wt % to 60 wt % polyolefin; and from 0.1 wt % to 40 wt % of a NFP; wherein the NFP comprises $C_6$ to $C_{200}$ paraffins having a pour point of less than −5° C. In another embodiment, the non-functionalized plasticizer comprises $C_8$ to $C_{100}$ paraffins. In yet another embodiment, the NFP comprises $C_6$ to $C_{50}$ isoparaffins, and $C_{10}$ to $C_{100}$ n-paraffins in yet another embodiment.

Described another way, the plasticized polyolefin of the present invention is a blend of a polyolefin and a non-functionalized plasticizer, wherein the non-functionalized plasticizer is a compound having a pour point of less than −30° C. in the viscosity range of from 0.5 to 200 cSt at 40° C. (ASTM D445-97) in one embodiment, and between −30° C. and −90° C. in the viscosity range of from 0.5 to 200 cSt at 40° C. (ASTM D445-97) in another embodiment.

The composition can also be described by any number of physical and chemical properties. For example, in one embodiment, the compositions of the invention are characterized in that the $T_g$ of the polyolefin decreases from 4 to 10° C. for every 4 wt % of NFP added to the composition, while the $T_m$ remains within 1 to 2° C.

The NFP of the present invention can be described by any number of physical and chemical properties described herein. For example, in one embodiment the non-functionalized plasticizer has a pour point of less than −30° C.; and a viscosity of from 0.1 to 3000 cSt at 100° C. in another embodiment; and a dielectric constant at 20° C. of less than 2.1 in yet another embodiment; and a specific gravity of less than 0.91 g/cm³ in yet another embodiment. In a further embodiment of the NFP, aromatic moieties are substantially absent.

Further, the NFP possesses a weight average molecular weight of from 100 to 25,000 g/mol; and from 200 to 10,000 g/mol in another embodiment.

The polyolefin suitable for compositions of the invention can be described by any number of embodiments. In one embodiment, the polyolefin comprises isotactic segments. In another embodiment, the polyolefin is selected from propylene homopolymers, propylene copolymers, and propylene impact copolymers, and mixtures thereof. In yet another embodiment, the polyolefin is isotactic polypropylene. And in yet another embodiment, the polyolefin is a copolymer comprises propylene derived units and units selected from ethylene derived units and $C_4$ to $C_{20}$ α-olefin derived units.

In yet another embodiment, the polyolefin is a propylene impact copolymer comprising from 40% to 95% by weight of a Component A and from 5% to 60% by weight of a Component B based on the total weight of copolymer; wherein Component A comprises propylene homopolymer or copolymer, the copolymer comprising 10% or less by weight ethylene, butene, hexene or octene comonomer; and wherein Component B comprises propylene copolymer, wherein the copolymer comprises from 5% to 70% by weight ethylene, butene, hexene and/or octene comonomer, and from 95% to 30% by weight propylene.

The polyolefin may further comprise a plastomer.

The compositions of the present invention may be described in a further embodiment wherein polyethylene having a weight average molecular weight of from 500 to 10,000 is substantially absent.

The present invention also includes a method of plasticizing a polyolefin comprising blending a polyolefin with a non-functionalized plasticizer; wherein the non-functionalized plasticizer comprises $C_6$ to $C_{200}$ paraffins having a pour point of less than −5° C. In one embodiment, the blending comprises melt blending. The melt blending is performed in an extruder in one embodiment.

In one embodiment, the blending comprises wet blending of solid polyolefin. The polyolefin is in the form of reactor granules in one embodiment, and extruded pellets in another embodiment, or a blend thereof. If reactor granules are used, the reactor granules have an average diameter of from 10 μm to 5 mm in one embodiment.

An article of manufacture can be formed from compositions of the invention, non-limiting examples of such articles include films, sheets, fibers, woven and nonwoven fabrics, tubes, pipes, automotive components, furniture, sporting equipment, food storage containers, transparent and semi-transparent articles, toys, tubing and pipes, and medical devices.

EXAMPLES

The present invention, while not meant to be limiting by, may be better understood by reference to the following examples and Tables.

The glass transition temperature ($T_g$) and storage modulus (E') were determined as follows by dynamic mechanical thermal analysis ("DMTA"). Dynamic mechanical testing was conducted by oscillating a solid rectangular beam, fixed at one end, trough an arbitrary angle of deflection. The force and angle of deflection are used to calculate stress and strain respectively. The ratio of the stress to strain yields a modulus. Varying the temperature during the test yields information about the behavior of the material as a function of temperature. The test parameters include a single cantilever; frequency of 1 Hz, start temperature of −130° C., max temperature of 60° C. Temperature is increased at a rate of 2° C./min. Tan δ is the ratio of E"/E' where E" is the loss modulus and E' is the storage modulus or elastic modulus. The glass transition temperature is determined by the temperature when of Tan δ reaches its maximal value.

Crystallization temperature ($T_c$) and melting temperature ($T_m$) was measured as follows: Differential Scanning Calorimetry (DSC, at a heating rate of 10° C./minute). As an example, about 6 to 10 mg of a sheet of the polymer or plasticized polymer was pressed at approximately 150° C. to 200° C. is removed with a punch die. The sample is placed in a Differential Scanning Calorimeter (Perkin Elmer 7 Series Thermal Analysis System) and heated to 200° C. and held for 10 minutes. The sample is cooled at 10° C./min. to attain a final temperature of 25° C. The thermal output is recorded and the inflection point in the thermal output data, indicating a change in the heat capacity is determined by electronically differentiating the thermal output data. The maximum in the differential thermal output data corresponds to the crystallization temperature of the sample. The sample is held at 25° C. for 10 minutes and heated at 10° C./min to 200° C. The thermal input is recorded and the inflection point in the thermal input data, indicating a change in the heat capacity is determined by electronically differentiating the thermal input data. The maximum in the differential thermal input data corresponds to the melting temperature of the sample.

Molecular weight distribution was determined using Gel Permeation Chromatography.

The shear viscosity as a function of shear rate was determined by a dual-barrel capillary rheometer. The capillary rheometer (Rosand Model RAH7/2 by Bohun Instruments) is equipped with a 30:1 length to diameter ratio capillary. A total mass of 25–30 g of pellets were packed into the capillary barrels and preheated at 230° C. for 10 minutes to remove any entrained air before the test. Each test was performed at 230° C. over the shear rate range of from 30 to 3000 $s^{-1}$. Corrections to the data for entrance pressure losses (i.e., the Bagley correction) were performed online via simultaneous pressure loss measurements for the flow of the material through an orifice that was installed into the second barrel of the rheometer.

Softness or "hand" of spunbond nonwoven fabric as it is known in the art was measured using the Thwing-Albert Handle-O-Meter (Model 211-10-B/America.) The quality of "hand" is considered to be the combination of resistance due to the surface friction and flexibility of a fabric material. The Hand-O-Meter measures the above two factors using and LVDT (Linear Variable Differential Transformer) to detect the resistance that a blade encounters when forcing a specimen of material into a slot of parallel edges. A 3½ digit digital voltmeter (DVM) indicates the resistance directly in grams. The "total hand" of any given sheet of material is the average of four readings taken on both sides and both directions of a test sample and is recorded in grams per standard width of sample material. A decrease in "total hand" indicates the improvement of fabric softness.

Other test methods are as described in the text of the Tables that follow.

The components of the present invention can be blended by any suitable means. The examples below demonstrate one method of blending the components. For samples 1–5, reactor granules of metallocene produced propylene homopolymers were first blended in a tumble blender with the addition of antioxidants, i.e., 600 ppm of Irganox 1076, and 260 ppm of calcium stearate, and 4 wt % of NFP for plasticized samples to achieve a homogeneous mixing of blend components. The blended polymers were compounded and pelletized using a 57 mm twin screw extruder at extrusion temperature of 230° C. For samples 10–14, reactor granules of propylene random copolymer were first blended in a tumble blender with reactor granules and the addition of antioxidants, i.e., 825 ppm of calcium stearate, 800 ppm of Ultranox 626, 500 ppm of TINUVIN 622 and 2500 ppm of Millad 3940, and 5 wt % of NFP for plasticized samples to achieve a homogeneous mixing of blend components. The blended polymers were compounded and pelletized using a 30 mm twin screw extruder at extrusion temperature of 216° C. For samples 15–19, the reactor granules of propylene impact copolymers were first blended in a tumble blender with reactor granules and the addition of antioxidants, i.e., 800 ppm of calcium stearate, 1500 ppm of IRGANOX 1010, 500 ppm of ULTRANOX 626 and 675 ppm of sodium benzoate, and 5 wt % of NFP for plasticized samples to achieve a homogeneous mixing of blend components. The blended polymers were compounded and pelletized using a 30 mm single screw extruder at extrusion temperature of 205° C. For samples 6–9, a 10 wt % plasticized metallocene propylene homopolymers were prepared in the same manner as described above for samples 1–5. For samples 21–24, the 10 wt % plasticized metallocene produced propylene homopolymers, prepared in the same manner as described above for samples 6–9, were dry blend with neat propylene polymers (Achieve™ 3854), in pellet form, to attain the 4 wt % active plasticized samples in the blends.

Standard ASTM tensile and HDT bars and Gardner impact discs were prepared using 120 ton injection molding equipment. Physical properties of the samples prepared are in the Tables below. Molded parts from the invention plasticized polypropylene homopolymers show a significant decrease in flexural and tensile modulus at a loading of 4 wt % PAO or isoparaffin, while maintaining their tensile strength, room temperature Izod Impact resistance and heat deflection temperature. For comparison, molded samples were also prepared with erucamide (Table 11), a common lubricant designed to reduce molded part surface friction of 4 wt % concentration. The effect of the erucamide on the flexural modulus is insignificant.

A typical spunbond process consists of a continuous filament extrusion, followed by drawing, web formation by the use of some type of ejector, and bonding the web. The polymer pellets are first fed into an extruder. In the extruder, the pellets simultaneously are melted and forced through the system by a heating melting screw. At the end of the screw, a spinning pump meters the molten polymer through a filter to a spinneret where the molten polymer is extruded under pressure through capillaries, at a rate of 0.4 grams per hole per minute. The spinneret contains a few hundred capillaries, measuring 0.4 mm in diameter. The polymer is melted at about 30–50° C. above its melting point to achieve sufficiently low melt viscosity for extrusion. The fibers exiting the spinneret are quenched and drawn into fine fibers measuring about 16 microns in diameter. The solidified fiber is laid randomly on a moving belt to form a random netlike structure known in the art as web. The 25 basis weight (grams per square meter) of web is obtained by controlling the belt moving speed. After web formation, the web is bonded to achieve its final strength using a heated textile calender known in the art as thermobond calender. The calender consists of two heated steel rolls; one roll is plain and the other bears a pattern of raised points. The web is conveyed to the calender wherein a fabric is formed by pressing the web between the rolls at a bonding temperature of about 138° C.

Cast films were prepared using the following operations. Cast monolayer films were fabricated on a Killion cast film line. This line has three 24:1 L/D 2.54 cm diameter extruder, which feed polymer into a feedblock. The feedblock diverts molten polymer from the extruder to a 20.32 cm wide Cloeren die. Molten polymer exits the die at a temperature of 230° C. and is cast on a chill roll (20.3 cm diameter, 25.4 cm roll face) at 21° C. The casting unit is equipped with adjustable winding speeds to obtain film of the targeted thickness.

Figure 11:
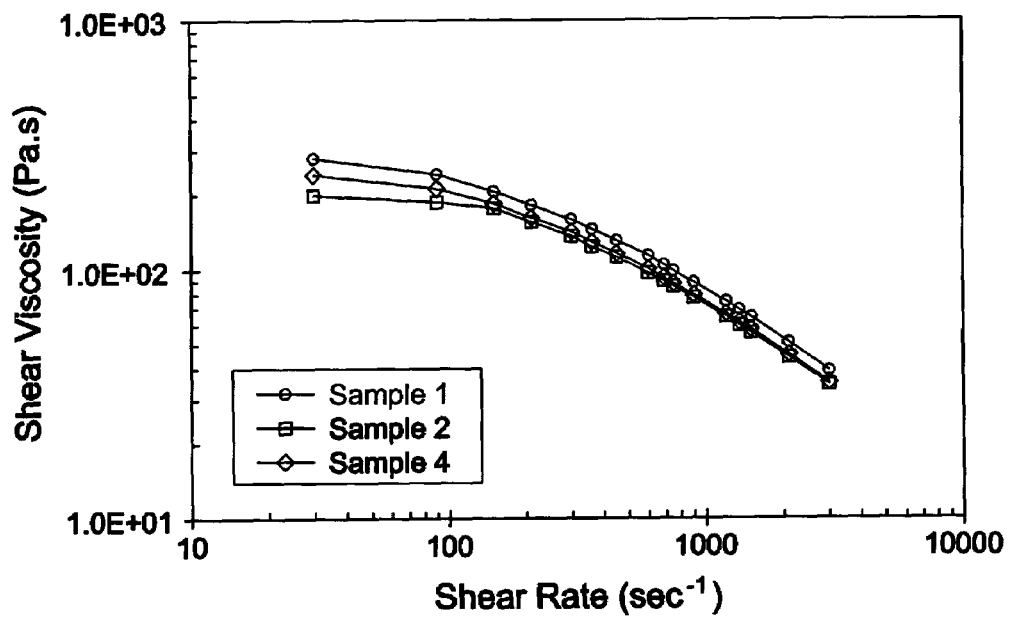
FIG. 11 is a graphical representation of the shear viscosity as a function of shear rate for various plasticized propylene homopolymer samples illustrative of the invention.
Figure 12:
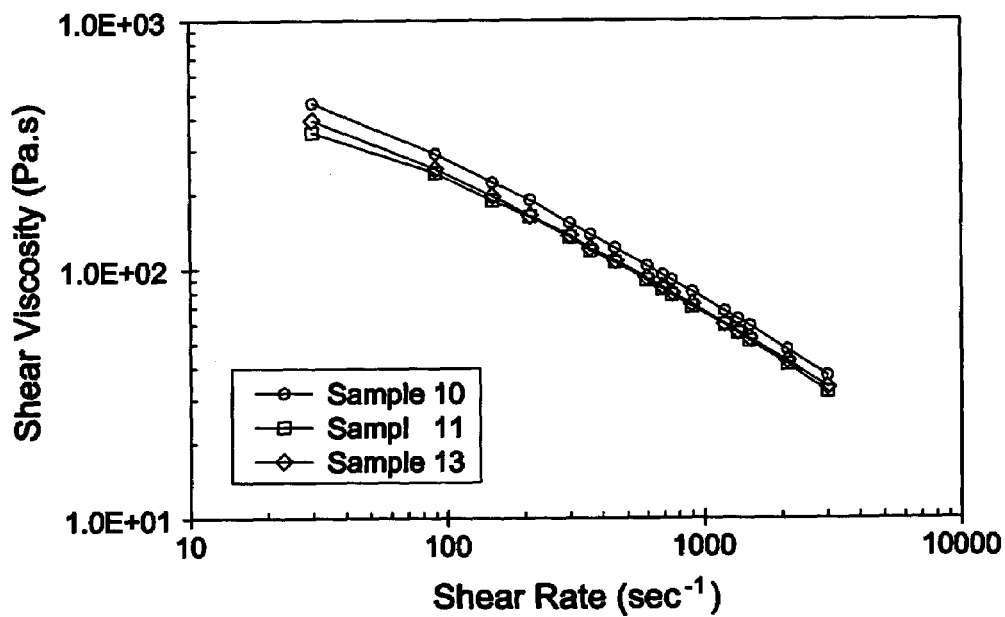
FIG. 12 is a graphical representation of the shear viscosity as a function of shear rate for various plasticized propylene copolymer samples illustrative of the invention.
Figure 13:
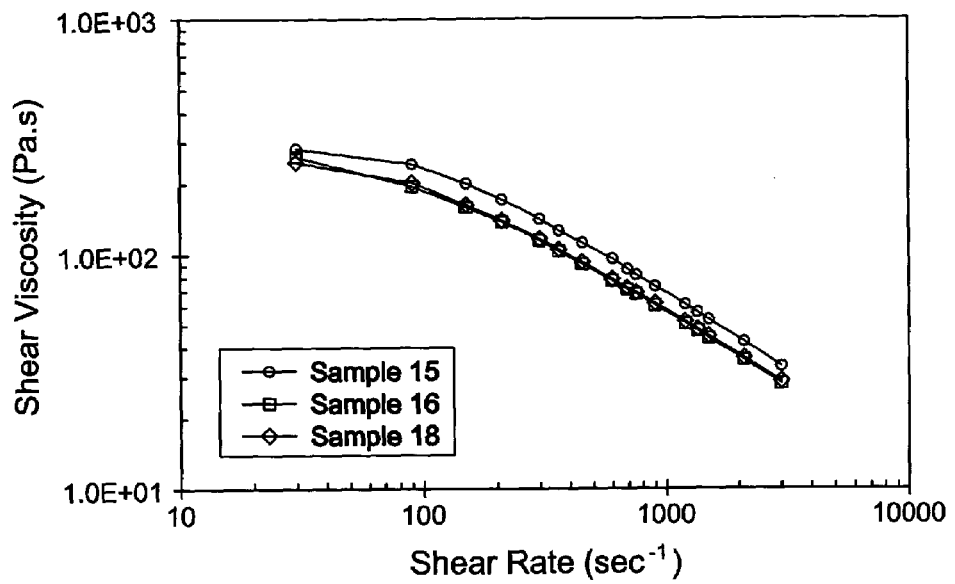
FIG. 13 is a graphical representation of the shear viscosity as a function of shear rate for various plasticized propylene impact copolymer samples illustrative of the invention.
Figure 14:
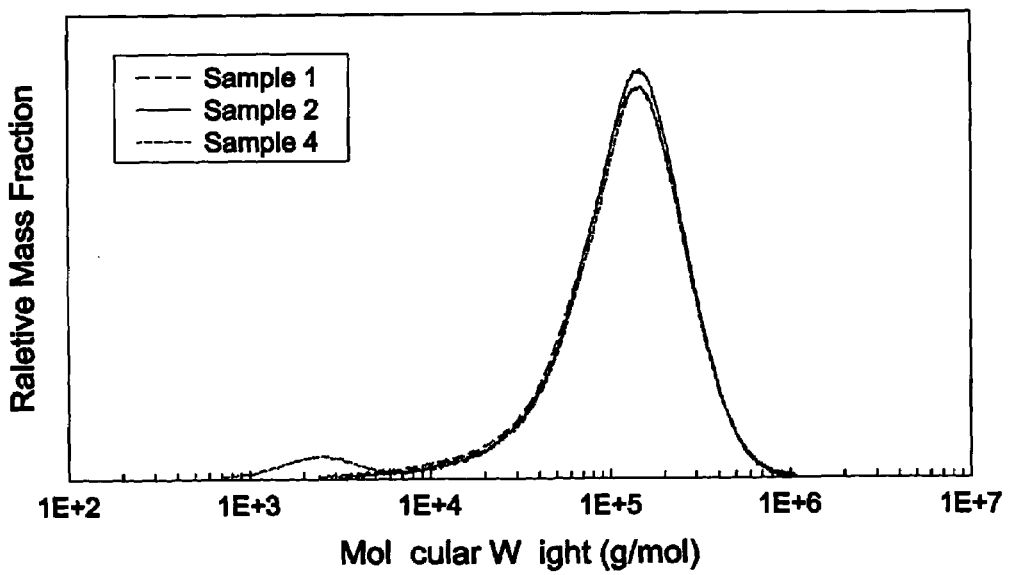
FIG. 14 is a graphical representation of the molecular weight distribution for various plasticized propylene homopolymer samples illustrative of the invention.

The resin properties of plasticized propylene homopolymers, propylene copolymers and propylene impact copolymers are listed, respectively, in Tables 5–7. The addition of NFP in the propylene polymers improve the melt flowability, as indicated by the significant increase of melt flow rate. The improvement of melt flowability can be characterized by the decrease of shear viscosity as a function of shear rate range, as illustrated in FIGS. 11–13. In contrast to the peroxide degrading, or so called "vis-breaking", process, the increase of melt flowability in the current invention is mainly due to the plasticizing effect of NFP, and the polymer molecular weight is unchanged. This is evident in the comparison of molecular weight distribution, as shown in FIG. 14. The improvement of melt flowability usually benefit the fabrication processes, i.e., fiber spinning, film casting, extrusion, injection molding, in terms of better draw-down, lower extruder torque, thin wall injection and faster cycle time.

The NFP in the current invention provides a significant depression in the storage modulus of propylene polymers. As illustrated in FIG. 1, the storage modulus of plasticized propylene polymers are drastically reduced as a function of temperature relative to the unplasticized polyolefins. A propylene polymer having lower a storage modulus (or "elastic modulus) at any particular range of temperature indicates the ability to provide better flexibility for the end-use at that particular temperature conditions.

The NFP in the current invention demonstrates the ability to depress $T_g$ without altering the melting temperature and crystallization temperature of propylene polymers, as illustrated in FIGS. 5–10. Traditional methods to depress $T_g$ include the incorporation of comonomers as in the case for the propylene copolymers, which also depresses the melting temperature and crystallization temperature of polymer. Polymers having lower $T_g$ without compromising the melting characteristics are very desirable and can provide better impact resistance, particularly for below freezing temperature impact resistance while maintaining the ability for high temperature usage. The plasticized polyolefins of the present invention provide this.

Figure 2:
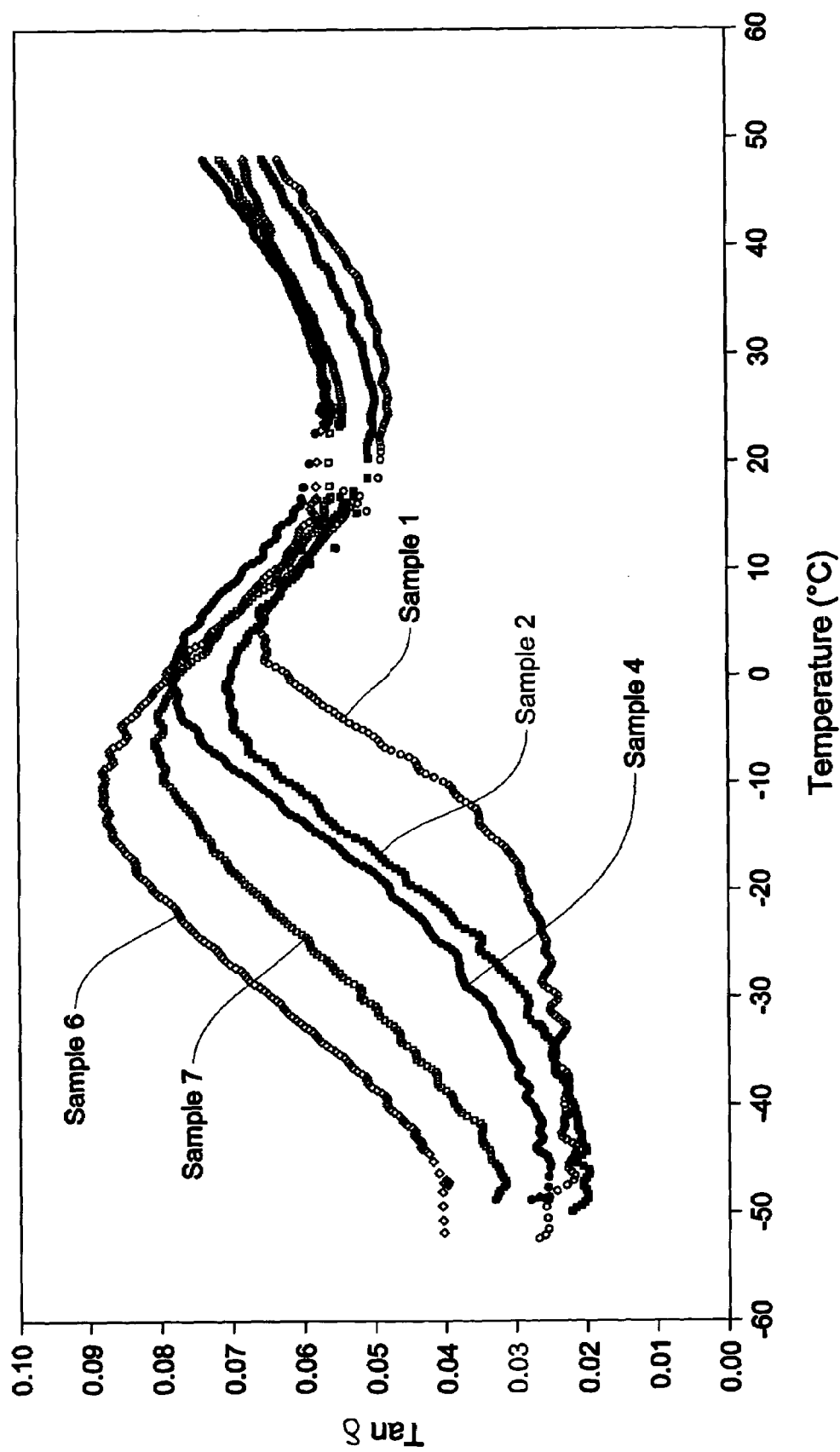
FIG. 2 is a graphical representation of the Tan δ as a function of temperature for various plasticized propylene homopolymer examples cited herein.
Figure 3:
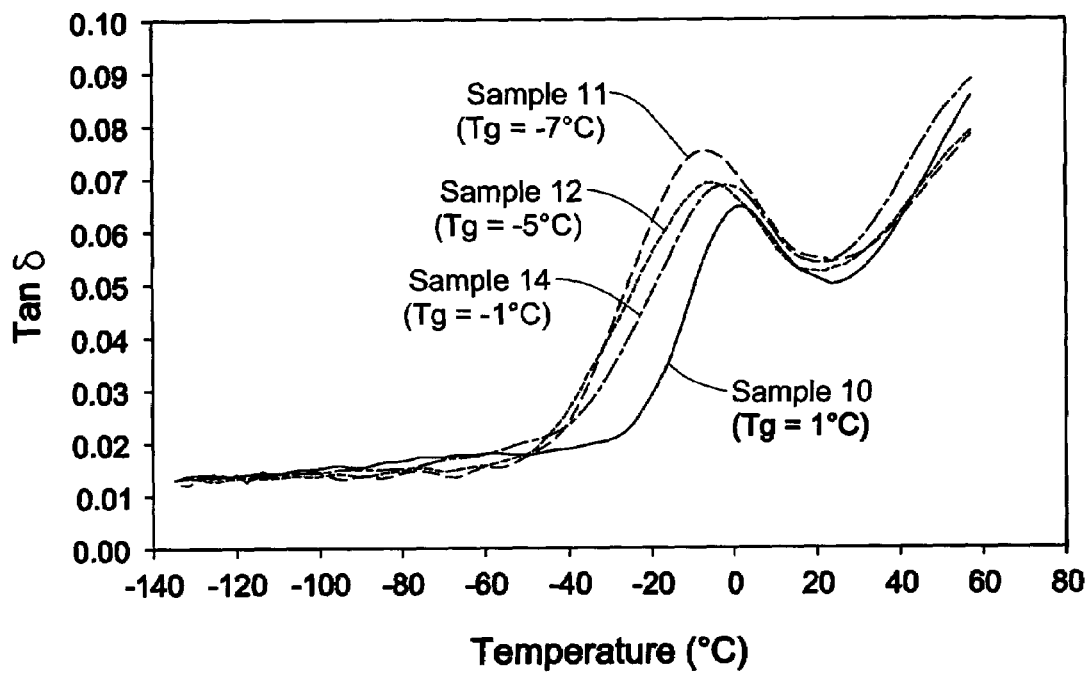
FIG. 3 is a graphical representation of the Tan δ as a function of temperature for various plasticized propylene copolymer examples cited herein.
Figure 4:
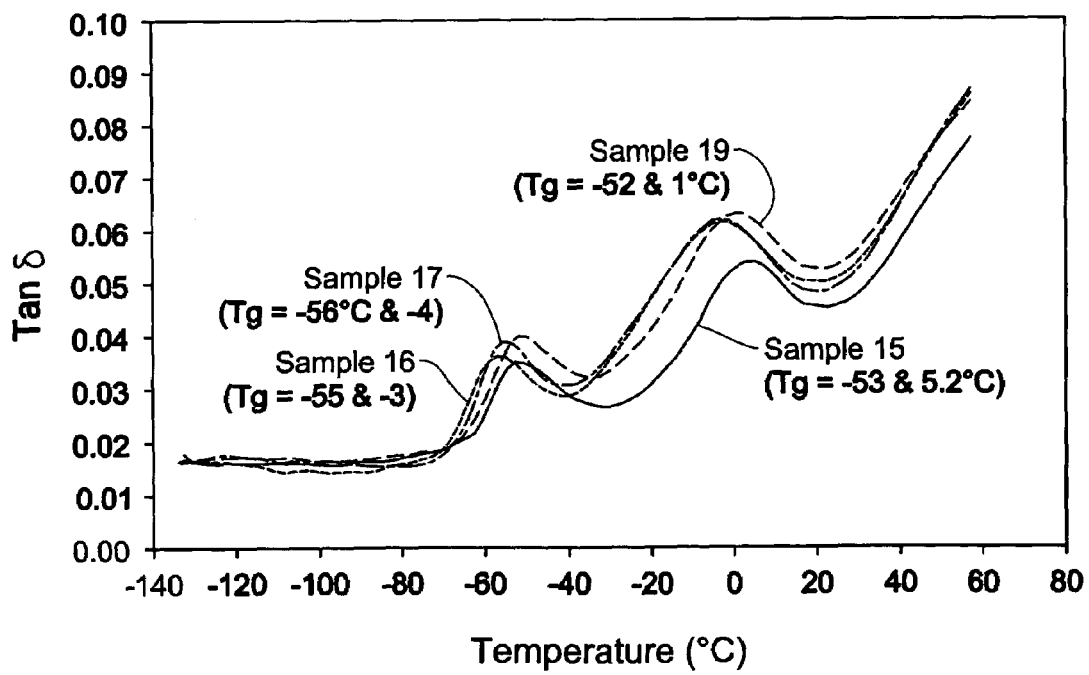
FIG. 4 is a graphical representation of the Tan δ as a function of temperature for various plasticized propylene impact copolymer examples cited herein.
Figure 5:
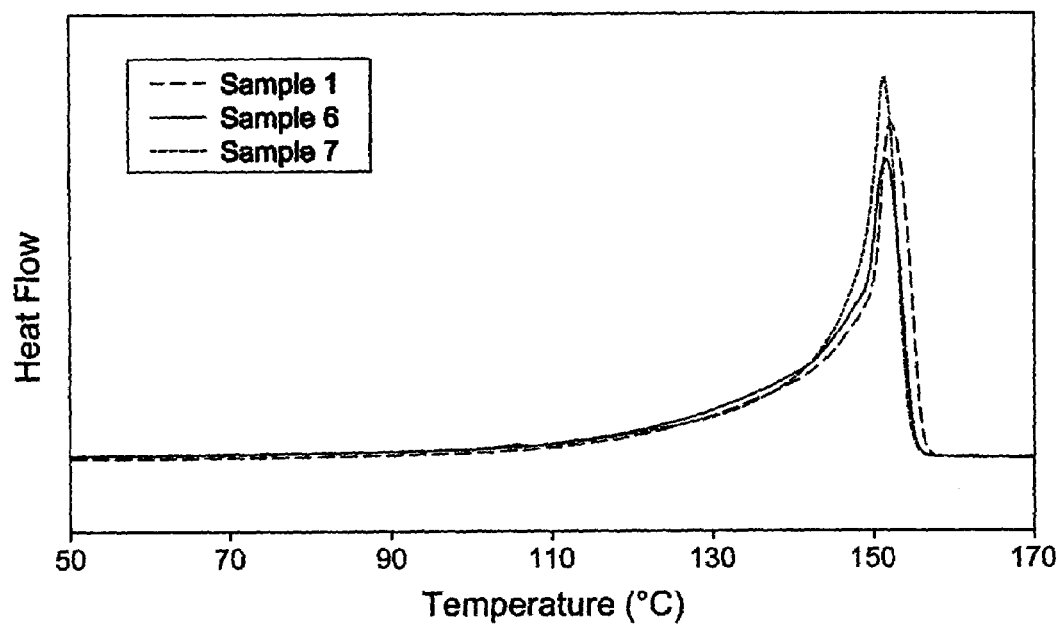
FIG. 5 is a graphical representation of the melting heat flow from DSC as a function of temperature for various plasticized propylene homopolymer samples illustrative of the invention.
Figure 6:
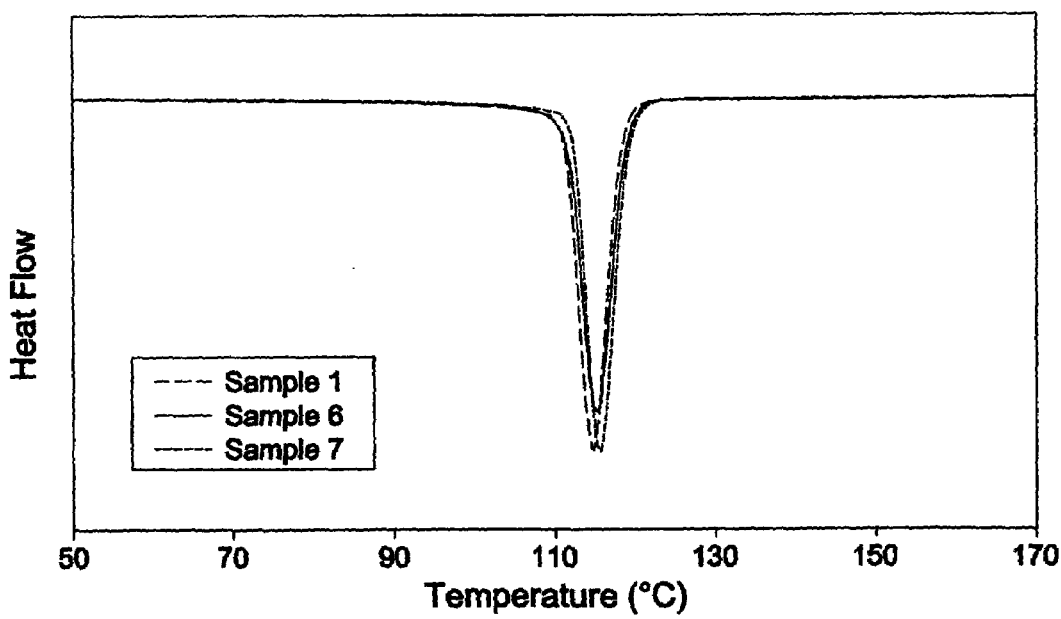
FIG. 6 is a graphical representation of the crystallization heat flow from DSC as a function of temperature for various samples plasticized propylene homopolymer samples illustrative of the invention.
Figure 7:
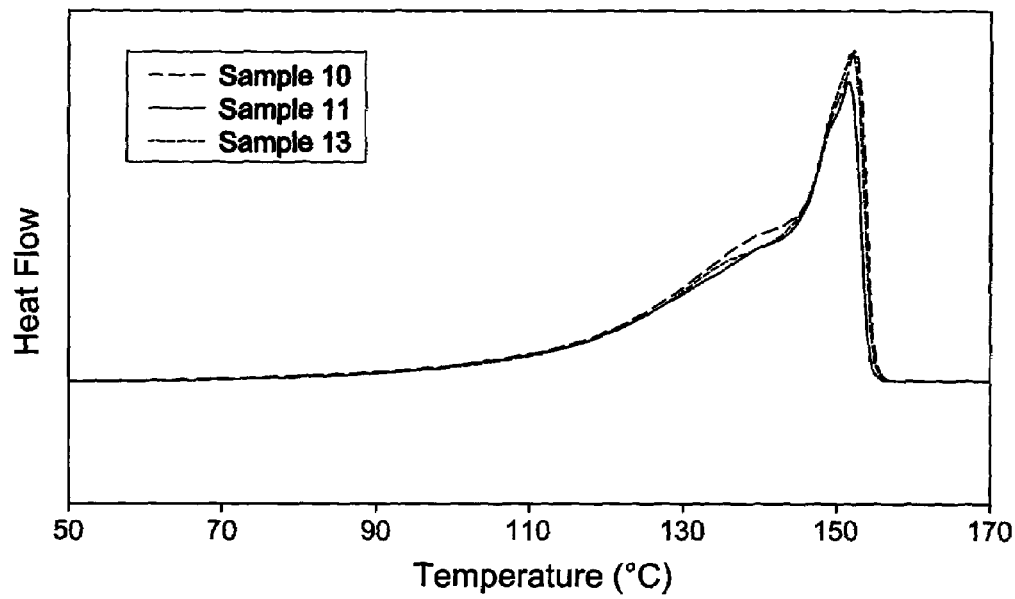
FIG. 7 is a graphical representation of the melting heat flow from DSC as a function of temperature for various plasticized propylene copolymer samples illustrative of the invention.
Figure 8:
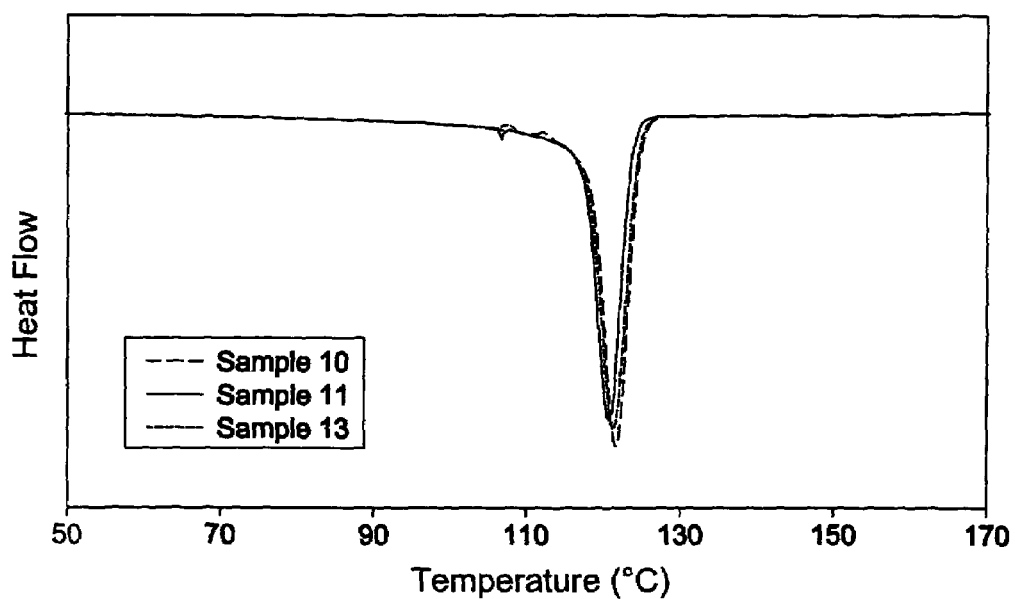
FIG. 8 is a graphical representation of the crystallization heat flow from DSC as a function of temperature for various plasticized propylene copolymer samples illustrative of the invention.
Figure 9:
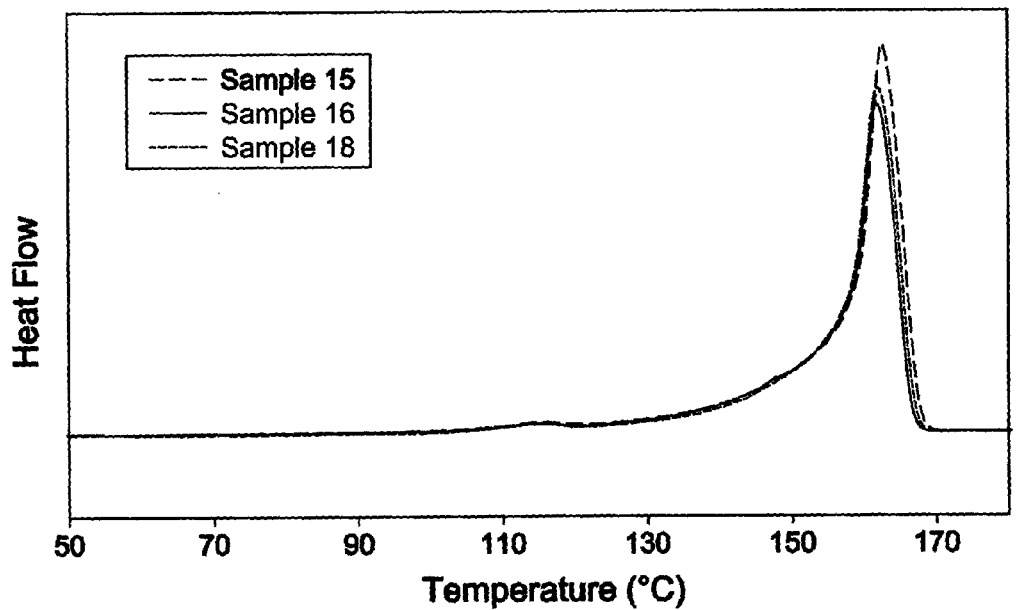
FIG. 9 is a graphical representation of the melting heat flow from DSC as a function of temperature for various plasticized propylene impact copolymer samples illustrative of the invention.
Figure 10:
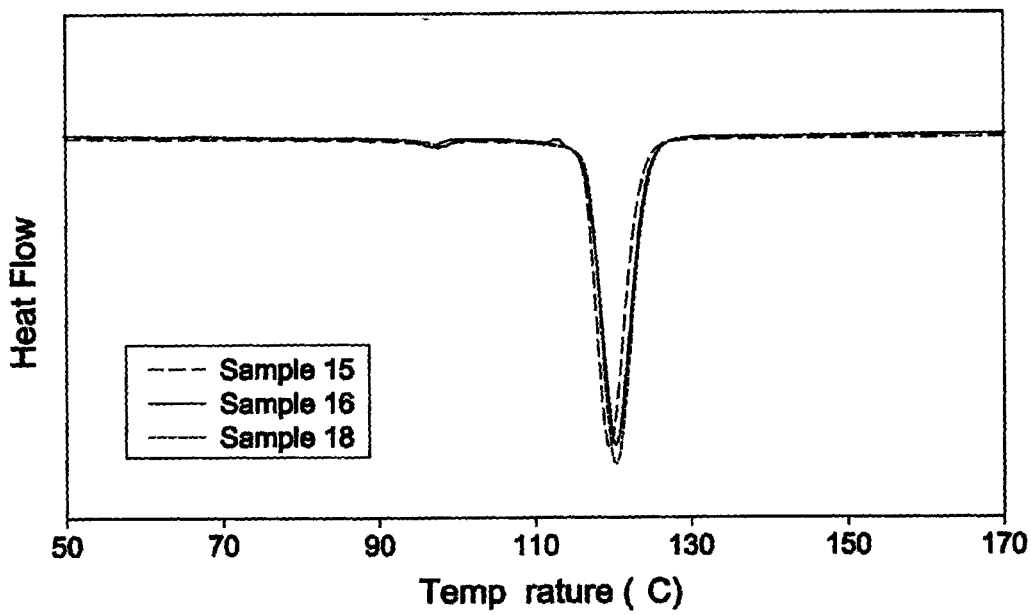
FIG. 10 is a graphical representation of the crystallization heat flow from DSC as a function of temperature for various plasticized propylene impact copolymer samples illustrative of the invention.

The NFP in the current invention is compatible and miscible with the propylene polymer, as determined by, for example, the single $T_g$ profile of the plasticized propylene homopolymer and propylene copolymer. This is shown graphically in FIGS. 2–3. The NFP in the current invention is also compatible and miscible with the propylene impact copolymer, as determined by, for example, the two $T_g$ profile of the plasticized propylene impact copolymer, being the lower $T_g$ profile for the ethylene-propylene rubber phase and the higher $T_g$ profile for the propylene polymer phase. This is shown graphically in FIG. 4.

The summary of injection molded properties are provided in Tables 8–10, respectively, for propylene homopolymers, propylene copolymers and propylene impact copolymers. The addition of NFP substantially improves the impact resistance of molded parts without the significant decrease of heat deflection temperature. For example, Gardner impact strength, at both room and freezing temperatures, has improved from 350% to 400% for propylene homopolymers, from 140 to 165% for propylene copolymers, and from 20 to 40% for propylene impact copolymers due to the addition of 4–5 wt % of NFP. It is anticipated that further increase of impact resistance is attainable by the increase of NFP concentration in the propylene polymers. Other measures of impact resistance, including Izod impact at room and freezing temperatures, are also significantly improved.

Another advantage of the current invention is that the heat deflection temperature of plasticized polyolefins is not compromised (either maintained or only slightly reduced) which is crucial for applications requiring maintenance of molded article dimensions at high temperature. Further indication of toughness improvement is shown by the significant increase of elongation at yield and break. Many applications require good conformability during the end-use. A higher elongation facilitates the compliance of molded articles to the deformation during either the conversion process or at the end-use.

The NFP also demonstrate the ability to provide substantial softness improvement in spunbond nonwoven fabrics, as provided by the lower "total hand" in Table 12. In many applications, particularly in personal hygiene and health care, a soft nonwoven is very desirable for skin contact comfort. The current invention not only provides the improvement in softness but also maintains the necessary tensile strength, tear resistance and fabric uniformity.

Comparison of film properties are listed in Table 13. The NFP, particularly the Isopar-V plasticized propylene homopolymer (Sample 2) provides improvement in the tear and impact resistance, as indicated by the relatively high (relative to the unplasticized polyolefin) Elmendorf tear in both machine direction (MD) and transverse direction (TD) and dart impact at both room and freezing temperatures. In addition, the optical properties, i.e., haze and gloss, are also improved. The improvement offers advantages in many film applications, for examples, food packaging, stationery cover, tape, medical and electronic packaging.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 4

List of Components in Examples

| Component | description | commercial source |
|---|---|---|
| Erucamide | cis-13-docosenoamide | Crompton Corporation |
| ISOPAR V | an isoparaffin; 0.82 g/cm$^3$ | ExxonMobil Chemical Company (Houston, TX) |
| Metallocene Polypropylene homopolymer | metallocene made homopolymer, 24 MFR; $M_w/M_n$ < 2.3, $T_m$ 152° C. | Achieve ™ 3854, ExxonMobil Chemical Company (Houston, TX) |
| Propylene copolymer | Z-N made copolymer, 12 MFR; $T_m$ 152° C. | Clarified PP 9054, ExxonMobil Chemical Company (Houston, TX) |
| Propylene impact copolymer | Z-N made impact copolymer, 21 MFR, $T_m$ 163° C. | PP7684 E2, ExxonMobil Chemical Company (Houston, TX) |
| SHF-101 | a PAO; 0.835 g/cm$^3$ | ExxonMobil Chemical Company (Houston, TX) |
| SHF-403 | a PAO; 0.850 g/cm$^3$ | ExxonMobil Chemical Company (Houston, TX) |
| SuperSyn 2150 | a PAO; 0.850 g/cm$^3$ | ExxonMobil Chemical Company (Houston, TX) |
| SuperSyn 23000 | a PAO; 0.857 g/cm$^3$ | ExxonMobil Chemical Company (Houston, TX) |

TABLE 5

Resin properties of plasticized metallocene propylene homopolymer

| | Sample No. | | | | | | | | |
|---|---|---|---|---|---|---|---|---|---|
| | 1 | 2 | 3 | 4 | 5 | 6 | 7 | 8 | 9 |
| | | | | | NFP | | | | |
| | None | Isopar-V | SHF-101 | SHF-403 | SuperSyn-2150 | Isopar-V | SHF-403 | SuperSyn-2150 | SuperSyn-23000 |
| | | | | | Concentration of NFP (wt %) | | | | |
| | 0 | 4 | 4 | 4 | 4 | 10 | 10 | 10 | 10 |
| Resin Properties | | | | | | | | | |
| Melt Flow Rate (230° C./2.16 kg) | 23 | 32 | 29 | 29 | 29 | 51 | 45 | 39 | 37 |
| Melting Temperature (° C.) | 152 | 151 | 153 | 152 | 153 | 152 | 151 | 152 | 152 |
| Crystallization Temperature (° C.) | 115 | 115 | 118 | 118 | 118 | 115 | 116 | 115 | 115 |
| Glass Transition Temperature (° C.) | 4 | −1 | −1 | 0 | 2 | −11 | −5 | −3 | 1 |

TABLE 6

Resin properties of plasticized propylene random copolymer

| | Sample No. | | | | |
|---|---|---|---|---|---|
| | 10 | 11 | 12 | 13 | 14 |
| | | | NFP | | |
| | None | Isopar-V | SHF-101 | SHF-403 | SuperSyn-2150 |
| | | | Concentration of NFP (wt %) | | |
| | 0 | 5 | 5 | 5 | 5 |
| Resin Properties | | | | | |
| Melt Flow Rate (230° C./2.16 kg) | 12 | 16 | 16 | 15 | 15 |
| Melting Temperature (° C.) | 152 | 152 | 152 | 152 | 152 |
| Crystallization Temperature (° C.) | 122 | 121 | 121 | 121 | 121 |
| Glass Transition Temperature (° C.) | 1 | −7 | −5 | −3 | −1 |

TABLE 7

Resin properties of plasticized propylene impact copolymer

| | Sample No. | | | | |
|---|---|---|---|---|---|
| | 15 | 16 | 17 | 18 | 19 |
| | | | NFP | | |
| | None | Isopar-V | SHF-101 | SHF-403 | SuperSyn-2150 |
| | | | Concentration of NFP (wt %) | | |
| | 0 | 5 | 5 | 5 | 5 |
| Resin Properties | | | | | |
| Melt Flow Rate (230° C./2.16 kg) | 23 | 32 | 29 | 29 | 29 |
| Melting Temperature (° C.) | 163 | 162 | 162 | 162 | 162 |
| Crystallization Temperature (° C.) | 119 | 120 | 120 | 120 | 121 |
| Glass Transition Temperature (° C.) | −53 and 5.2 | −55 and −3 | −56 and −4 | −50 and −1 | −52 and 1 |

TABLE 8

Molded part properties of metallocene propylene homopolymers

| | | Sample No. | | | | |
|---|---|---|---|---|---|---|
| | | 1 | 2 | 3 | 4 | 5 |
| | | | | NFP: | | |
| | | None | Isopar V | SHF-101 | SHF-403 | SuperSyn-2150 |
| | | | | Concentration of NFP (wt %) | | |
| | ASTM Method | 0 | 4 | 4 | 4 | 4 |
| Optical | | | | | | |
| Haze (0.04 in injection molded paique) (%) | D 1003 | 65 | 62 | 65 | 61 | 64 |
| Gloss @ 45° | D 2457 | 85 | 87 | 86 | 85 | 86 |
| Mechanical | | | | | | |
| Tensile Strength @ Yield (kpsi) | D 638 | 4.9 | 4.4 | 4.5 | 4.5 | 4.6 |
| Elongation @ Yield (%) | D 638 | 9 | 12 | 11 | 11 | 10 |
| Flexural Modulus, 1% Secant (kpsi) | D 790A | 200 | 155 | 175 | 177 | 179 |
| Heat Deflection Temperature @ 66 psi (° C.) | D 648 | 105 | 101 | 108 | 107 | 104 |
| Rockwell Hardness (R-Scale) | D 785 | 104 | 97 | 99 | 99 | 99 |
| Impact | | | | | | |
| Notch Izod Impact @ 23° C. (ft-lb/in) | D 256A | 0.4 | 0.7 | 0.6 | 0.6 | 0.5 |
| Gardner Impact Strength 0.125 in thick disk @ 23° C. (in-lb) | D 5420 | 31 | 153 | 166 | 164 | 141 |
| Gardner Impact Strength 0.125 in thick disk @ ° C. (in-lb) | D 5420 | Note[a] | 14 | <8[b] | <8[b] | <8[b] |

[a]Samples too brittle to perform this test.
[b]Samples failed at the lowest hammer weight.

TABLE 9

Molded part properties of propylene random copolymers

| | | Sample No. | | | | |
|---|---|---|---|---|---|---|
| | | 10 | 11 | 12 | 13 | 14 |
| | | | | NFP: | | |
| | | None | Isopar V | SHF-101 | SHF-403 | SuperSyn-2150 |
| | | | | Concentration of NFP (wt %) | | |
| | ASTM Method | 0 | 5 | 5 | 5 | 5 |
| Optical | | | | | | |
| Haze (0.04 in injection molded palque) (%) | D 1003 | 8.2 | 10.3 | 8.7 | 11.7 | 11.6 |
| Gloss @ 45° | D 2457 | 80 | 81 | 79 | 75 | 76 |

TABLE 9-continued

Molded part properties of propylene random copolymers

| | | Sample No. | | | | |
|---|---|---|---|---|---|---|
| | | 10 | 11 | 12 | 13 | 14 |
| | | | | NFP: | | |
| | | None | Isopar V | SHF-101 | SHF-403 | SuperSyn-2150 |
| | | | | Concentration of NFP (wt %) | | |
| | ASTM Method | 0 | 5 | 5 | 5 | 5 |
| Mechanical | | | | | | |
| Tensile Strength @ Yield (kpsi) | D 638 | 5.0 | 4.4 | 4.4 | 4.4 | 4.4 |
| Elongation @ Yield (%) | D 638 | 9 | 14 | 13 | 11 | 11 |
| Elongation @ Break (%) | D 638 | 185 | 754 | 559 | 259 | 196 |
| Flexural Modulus, 1% Secant (kpsi) | D 790A | 205 | 141 | 158 | 166 | 173 |
| Heat Deflection Temperature @ 66 psi (° C.) | D 648 | 87 | 84 | 85 | 77 | 77 |
| Impact | | | | | | |
| Notch Izod Impact @ 23° C. (ft-lb/in) | D 256A | 0.9 | 2.0 | 1.2 | 1.2 | 1.2 |
| Unnotch Izod Impact @ −18° C. (ft-lb/in) | D 256A | 3.9 | 12.6 | 12.4 | 10.5 | 9.0 |
| Gardner Impact Strength 0.125 in thick disk @ 23° C. (in-lb) | D 5420 | 83 | 203 | 207 | 201 | 219 |

TABLE 10

Molded part properties of propylene impact copolymers

| | | Sample No. | | | | |
|---|---|---|---|---|---|---|
| | | 15 | 16 | 17 | 18 | 19 |
| | | | | NFP: | | |
| | | None | Isopar V | SHF-101 | SHF-403 | SuperSyn-2150 |
| | | | | Concentration of NFP (wt %) | | |
| | ASTM Method | 0 | 5 | 5 | 5 | 5 |
| Mechanical | | | | | | |
| Tensile Strength @ Yield (kpsi) | D 638 | 3.3 | 3.0 | 3.0 | 3.0 | 3.0 |
| Elongation @ Yield (%) | D 638 | 5 | 12 | 10 | 8 | 8 |
| Elongation @ Break (%) | D 638 | 125 | 230 | 185 | 120 | 110 |
| Flexural Modulus, 1% Secant (kpsi) | D 790A | 163 | 112 | 124 | 132 | 135 |
| Heat Deflection Temperature @ 66 psi (° C.) | D 648 | 95 | 81 | 88 | 84 | 86 |
| Impact | | | | | | |
| Notch Izod Impact @ 23° C. (ft-lb/in) | D 256A | 4.8 | 6.5 | 6.0 | 3.9 | 3.5 |
| Gardner Impact Strength 0.125 in thick disk @ −29° C. (in-lb) | D 5420 | 123 | 170 | 165 | 159 | 148 |

TABLE 11

Molded part properties of metallocene propylene homopolymers

| | | Sample No. | | | | |
|---|---|---|---|---|---|---|
| | | 20 | 21 | 22 | 23 | 24 |
| | | | | NFP | | |
| | | none | Isopar V | SHF-403 | SuperSyn-23000 | Erucamide |
| | | | | Concentration of NFP (%) | | |
| | ASTM Method | 0 | 4 | 4 | 4 | 4 |
| Resin Properties | | | | | | |
| Melt Flow Rate (230° C./2.16 kg) | D 1238 | 24 | 35 | 33 | 30 | 23 |
| Mechanical | | | | | | |
| Tensile Strength @ Yield (kpsi) | D 638 | 4.7 | 4.5 | 4.4 | 4.5 | 4.5 |
| Elongation @ Yield (%) | D 638 | 9 | 11 | 11 | 10 | 11 |

TABLE 11-continued

Molded part properties of metallocene propylene homopolymers

| | | Sample No. | | | | |
|---|---|---|---|---|---|---|
| | | 20 | 21 | 22 | 23 | 24 |
| | | | | NFP | | |
| | | none | Isopar V | SHF-403 | SuperSyn-23000 | Erucamide |
| | | | | Concentration of NFP (%) | | |
| | ASTM Method | 0 | 4 | 4 | 4 | 4 |
| Flexural Modulus, 1% Secant (kpsi) | D 790A | 190 | 155 | 170 | 180 | 188 |
| Heat Deflection Temperature @ 66 psi (° C.) | D 648 | 92 | 94 | 90 | 90 | 89 |
| Impact | | | | | | |
| Notch Izod Impact @ 23° C. (ft-lb/in) | D 256A | 0.4 | 0.5 | 0.3 | 0.4 | 0.4 |
| Unnotch Izod Impact @ −18° C. (ft-lb/in) | D 256A | 2.7 | 3.1 | 3.0 | n/a | n/a |

TABLE 12

Softness properties per total hand of spunbond nonwoven fabrics made of metallocene propylene homopolymers

| | | Sample No. | | | | |
|---|---|---|---|---|---|---|
| | | 1 | 2 | 3 | 4 | 5 |
| | | | | NFP: | | |
| | | None | Isopar V | SHF-101 | SHF-403 | SuperSyn-2150 |
| | | | | Concentration of NFP (%) | | |
| | ASTM Method | 0 | 4 | 4 | 4 | 4 |
| Fabric Properties | | | | | | |
| Peak Load (lbs) MD/TD | D 882 | 9.4/4.8 | 8.0/4.4 | 7.8/4.1 | 8.3/4.1 | 7.5/3.9 |
| Elongation @ Break (%) MD/TD | D 882 | 76/77 | 65/76 | 58/67 | 72/73 | 64/73 |
| Elmendorf Tear (g/basis weight) TD | D 1922 | 17 | 19 | 15 | 18 | 20 |
| Total Hand (grams) | | 31 | 32 | 24 | 21 | 15 |

Total hand is based on measurements on fabrics at 25 gsm (grams per square meter).

TABLE 13

Cast film properties of metallocene propylene homopolymers

| | | Sample No. | | | | |
|---|---|---|---|---|---|---|
| | | 1 | 2 | 3 | 4 | 5 |
| | | | | NFP: | | |
| | | none | Isopar V | SHF-101 | SHF-403 | SuperSyn-2150 |
| | | | | Concentration of NFP (%) | | |
| | ASTM Method | 0 | 4 | 4 | 4 | 4 |
| Optical | | | | | | |
| Haze (%) | D 1003 | 8.8 | 6.2 | 16.7 | 14.7 | 10.5 |
| Gloss | D 2457 | 68 | 70 | 57 | 58 | 65 |
| Mechanical | | | | | | |
| 1% Sec. Modulus (kpsi) MD/TD | D 882 | 140/130 | 84/86 | 119/120 | 133/121 | 120/115 |
| Tensile Strength @ Break (kpsi) MD/TD | D 882 | 7.6/7.8 | 7.5/7.1 | 7.1/7.5 | 7.2/7.0 | 7.0/6.9 |
| Elongation @ Break (%) MD/TD | D 882 | 730/728 | 725/680 | 770/792 | 785/765 | 738/739 |
| Elmendorf Tear(g/mil) MD | D 1922 | 29/32 | 54/58 | 17/19 | 17/18 | 22/24 |
| Puncture (lb/mil) | D 3420 | 9.0 | 8.1 | 8.6 | 8.6 | 9.2 |
| Puncture Energy (in. lb/mil) | D 3420 | 18 | 21 | 19 | 17 | 20 |
| Total Energy Dart Impact (ft. lb) | D 4272 | | | | | |
| @ 23° C. | | 0.4 | 1.9 | 0.6 | 0.7 | 0.6 |
| @ −15° C. | | 0.04 | 0.07 | 0.09 | 0.09 | 0.05 |

Films properties are based on 2 mil thickness.

We claim:

1. A plasticized polyolefin composition comprising from 99 wt % to 60 wt % polyolefin; and from 1 wt% to 40 wt% of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is polypropylene, homopolymer having a melt flow rate of from 0.1 to 2500 dg/min or propylene copolymer having up to 0.1 to 30 wt % of a comonomer selected from the group consisting of ethylene and C4 to C20 alpha-olefins, said copolymer having a melt flow rate of from 0.1 to 2500 dg/min, and wherein polyethylene homopolymer and copolymer having a weight average molecular weight of from 500 to 10,000 is substantially absent from the composition.

2. The composition of claim 1, wherein the non-functionalized plasticizers comprises $C_8$ to $C_{100}$ paraffins.

3. The composition of claim 1, wherein the non-functionalized plasticizers comprises $C_{10}$ to $C_{100}$ n-paraffins.

4. The composition of claim 1, wherein the $T_g$ of the polyolefin decreases from 4 to 10° C. for every 4 wt % of non-functionalized plasticizer added to the composition, while the $T_m$ remains within 1 to 2° C.

5. The composition of claim 1, wherein the non-functionalized plasticizer has a pour point of less than −40° C.

6. The composition of claim 1, wherein the non-functionalized plasticizer has a viscosity of from 10 to 200 cSt at 100° C.

7. The composition of claim 1, wherein the non-functionalized plasticizer has a dielectric constant at 20° C. of less than 2.3.

8. The composition of claim 1, wherein the non-functionalized plasticizer has a specific gravity of less than 0.91.

9. The composition of claim 1, wherein aromatic moieties are substantially absent from the non-functionalized plasticizer.

10. The composition of claim 1, wherein the weight average molecular weight of the non-functionalized plasticizer is from 100 to 25,000 g/mol.

11. The composition of claim 1, wherein the weight average molecular weight of the non-functionalized plasticizer is from 200 to 10,000 g/mol.

12. The composition of claim 1 wherein the non-functionalized plasticizer has a pour point of less than −50° C.

13. The composition of claim 1, further comprising slip agent.

14. An article of manufacture selected from films, sheets, fibers, woven and nonwoven fabrics, tubes, pipes, automotive components, furniture, sporting equipment, food storage containers, transparent and semi-transparent articles, toys, tubing and pipes, or medical devices comprising the composition of claim 1.

15. A plasticized polyolefin composition comprising from 99.9 wt % to 60 wt % polyolefin; and from 0.1 wt % to 40 wt % of a non-functionalized plasticizer; wherein the non-functionalized plasticizer has a weight average molecular weight of 100 to 25,000 g/mol and comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is a propylene impact copolymer comprising from 40% to 95% by weight of a Component A and from 5% to 60% by weight of a Component B based on the total weight of copolymer, wherein Component A comprises propylene homopolymer or copolymer, the copolymer comprising 10% or less by weight ethylene, butane, hexene or octane comonomer; and wherein Component B comprises propylene copolymer, wherein the copolymer comprises from 5% to 70% by weight ethylene, butene, hexene and/or octene comonomer, and from 95% to 30% by weight propylene.

16. The composition of claim 15, wherein the non-functionalized plasticizer comprises $C_8$ to $C_{100}$ paraffins.

17. The composition of claim 15, wherein the non-functionalized plasticizer comprises $C_{10}$ to $C_{100}$ n-paraffins.

18. The composition of claim 15, wherein the $T_g$ of the polyolefin decreases from 4 to 10° C. for every 4 wt % of non-functionalized plasticizer added to the composition, while the $T_m$ remains within 1 to 2° C.

19. The composition of claim 15, wherein the non-functionalized plasticizer has a pour point of less than −40° C.

20. The composition of claim 15, wherein the non-functionalized plasticizer has a viscosity of from 10 to 200 cSt at 100° C. and is present at 1 to 40 wt% and the polyethylene homopolymer and copolymer having a weight average molecular weight of from 500 to 10,000 is substantially absent from the composition.

21. The composition of claim 15, wherein the non-functionalized plasticizer has a dielectric constant at 20° C. of less than 2.3.

22. The composition of claim 15, wherein the non-functionalized plasticizer has a specific gravity of from 0.700 to 0.860.

23. The composition of claim 15, wherein aromatic moieties are substantially absent from the non-functionalized plasticizers.

24. The composition of claim 15, wherein the weight average molecular weight of the non-functionalized plasticizer is from 200 to 25,000 g/mol.

25. The composition of claim 15, wherein the weight average molecular weight of the non-functionalized plasticizer is from 200 to 10,000 g/mol.

26. An article of manufacture selected from films, sheets, fibers, woven and nonwoven fabrics, tubes, pipes, automotive components, furniture, sporting equipment, food storage containers, transparent and semi-transparent articles, toys, tubing and pipes, or medical devices comprising the composition of claim 15.

27. A plasticized polyolefin composition comprising from 99.9 wt % to 60 wt % polyolefin; and from 0.1 wt % to 40 wt % of a non-functionalized plasticizer having a pour point of less than −30° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein:
   a) elastomers are substantially absent from the composition,
   b) the polyolefin is selected from propylene homopolymers, propylene copolymers, propylene impact copolymers, or mixtures thereof, where the propylene impact copolymers are reactor blends,
   c) the polyolefin has a melt flow rate of from 0.1 to 2500 dg/min, and
   d) polyethylene homopolymer and copolymer having a weight average molecular weight of from 500 to 10,000 is substantially absent from the composition.

28. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −60° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends.

29. A plasticized polyolefin composition comprising from 99.9 wt % to 60 wt % polyolefin; and from 0.1 wt % to 40 wt % of a non-functionalized plasticizer having a pour point of less than −60° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein elastomers are substantially absent from the composition, and wherein the polyolefin is selected from propylene homopolymers, propylene copolymers, propylene impact copolymers, or mixtures thereof, where the propylene impact copolymers are reactor blends.

30. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene impact copolymers, or mixtures thereof, where the propylene impact copolymers are reactor blends, wherein the composition further comprises plastomer having a 1% secant flexural modulus of from 10 MPa to 150 MPa.

31. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, where the composition further comprises a plastomer which is a copolymer of ethylene and from 2 to 35 weight % of alpha-olefin derived units selected from the group consisting of 1-butene, 1-hexene and 1-octene, wherein the plastomer has a density of from 0.860 to 0.900 g/cm³.

32. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene impact copolymers, or mixtures thereof, where the propylene impact copolymers are reactor blends, where the composition further comprises a plastomer which is a copolymer of ethylene and from 2 to 35 weight % of alpha-olefin derived units selected from the group consisting of 1-butene, 1-hexene and 1-octene, wherein the plastomer has a density of from 0.860 to 0.900 g/cm³.

33. A plasticized polyolefin composition comprising from 99.9 wt % to 60 wt % polyolefin; and from 0.1 wt % to 40 wt % of a non-functionalized plasticizer having a pour point of less than −30° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein elastomers are substantially absent from the composition, and wherein the polyolefin is selected from propylene homopolymers, propylene impact copolymers, or mixtures thereof, where the propylene impact copolymers are reactor blends wherein the composition further comprises plastomer having a 1% secant flexural modulus of from 10 MPa to 150 MPa.

34. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends wherein the composition further comprises plastomer having a 1% secant flexural modulus of from 10 MPa to 150 MPa.

35. A plasticized polyolefin composition comprising from 99.9 wt % to 60 wt % polyolefin; and from 0.1 wt % to 40 wt % of a non-functionalized plasticizer having a pour point of less than −30° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein elastomers are substantially absent from the composition, and wherein the polyolefin is selected from propylene homopolymers, propylene impact copolymers, or mixtures thereof, where the propylene impact copolymers are reactor blends where the composition further comprises a plastomer which is a copolymer of ethylene and from 2 to 35 weight % of alpha-olefin derived units selected from the group consisting of 1-butene, 1-hexene and 1-octene, wherein the plastomer has a density of from 0.860 to 0.900 g/cm³.

36. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene copolymers, propylene impact copolymers, or mixtures thereof, where the propylene impact copolymers are reactor blends, wherein the composition further comprises plastomer having a 1% secant flexural modulus of from 10 MPa to 150 MPa.

37. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene copolymers, propylene impact copolymers, or mixtures thereof, where the propylene impact copolymers are reactor blends, where the composition further comprises a plastomer which is a copolymer of ethylene and from 2 to 35 weight % of alpha-olefin derived units selected from the group consisting of 1-butene, 1-hexene and 1-octene, wherein the plastomer has a density of from 0.860 to 0.900 g/cm³.

38. A plasticized polyolefin composition comprising from 99.9 wt % to 60 wt % polyolefin; and from 0.1 wt % to 40 wt % of a non-functionalized plasticizer having a pour point of less than −30° C.; wherein the $T_g$ of the polyolefin decreases by at least 2° C. for every 4 wt % of non-functionalized plasticizer added to the composition, while the $T_m$ remains within 1 to 2° C., and a Kinematic viscosity of from 10 cSt to 500 cSt at 100° C. and wherein elastomers are substantially absent from the composition, and wherein the polyolefin is selected from propylene copolymers, propylene impact copolymers, or mixtures thereof, where the propylene impact copolymers are reactor blends wherein the composition further comprises plastomer having a 1% secant flexural modulus of from 10 MlPa to 150 MPa.

39. A plasticized polyolefin composition comprising from 99.9 wt % to 60 wt % polyolefin; and from 0.1 wt % to 40 wt % of a non-functionalized plasticizer having a pour point of less than −30° C.; wherein the $T_g$ of the polyolefin decreases by at least 2° C. for every 4 wt % of non-functionalized plasticizer added to the composition, while the $T_m$ remains within 1 to 2° C., and a Kinematic viscosity of from 10 cSt to 500 cSt at 100° C. and wherein elastomers are substantially absent from the composition, and wherein the polyolefin is selected from propylene copolymers, propylene impact copolymers, or mixtures thereof, where the propylene impact copolymers are reactor blends where the composition further comprises a plastomer which is a copolymer of ethylene and from 2 to 35 weight % of alpha-olefin derived units selected from the group consisting of 1-butene, 1-hexene and 1-octene, wherein the plastomer has a density of from 0.860 to 0.900 g/cm³.

40. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, wherein the composition further comprises a plastomer, which is a metallocene catalyzed copolymer of ethylene and from 2 to 35 weight % of alpha-olefin derived units selected from the group consisting of 1-butene, 1-hexene and 1-octene, wherein the plastomer has a density of from 0.860 to 0.900 g/cm³, an Mw/Mn of 1.5 to 5, a melt index between 0.1 and 20 dg/min, and a melting temperature of from 30 to 80° C. (first melt peak) and from 50 to 125 (second melt peak).

41. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the compositions and wherein the polyolefin is selected from propylene homopolymers, propylene impact copolymers, or mixtures thereof, where the propylene impact copolymers are reactor blends, and wherein the composition further comprises plastomer having a melting temperature of from 30 to 80° C. (first melt peak) and from 50 to 125 (second melt peak).

42. A plasticized polyolefin composition comprising from 99.9 wt % to 60 wt % polyolefin; and from 0.1 wt % to 40 wt % of a non-functionalized plasticizer having a pour point of less than −30° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein elastomers are substantially absent from the composition, and wherein the polyolefin is selected from propylene homopolymers, propylene impact copolymers, or mixtures thereof, where the propylene impact copolymers are reactor blends and wherein the composition further comprises plastomer having a melting temperature of from 30 to 80° C. (first melt peak) and from 50 to 125 (second melt peak).

43. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene copolymers, propylene impact copolymers, or mixtures thereof, where the propylene impact copolymers are reactor blends, wherein the composition further comprises plastomer having a melting temperature of from 30 to 80° C. (first melt peak) and from 50 to 125 (second melt peak).

44. A plasticized polyolefin composition comprising from 99.9 wt % to 60 wt % polyolefin; and from 0.1 wt % to 40 wt % of a non-functionalized plasticizer having a pour point of less than −30° C. and a Kinematic viscosity of from 10 cSt to 500 cSt at 100° C.; wherein the $T_g$ of the polyolefin decreases by at least 2° C. for every 4 wt % of non-functionalized plasticizer added to the composition, while the $T_m$ remains within 1 to 2° C., and wherein elastomers are substantially absent from the composition, and wherein the polyolefin is selected from propylene copolymers, propylene impact copolymers, or mixtures thereof, where the propylene impact copolymers are reactor blends wherein the composition further comprises plastomer having a melting temperature of from 30 to 80° C. (first melt peak) and from 50 to 125 (second melt peak).

45. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, and wherein the composition further comprises plastomer having a melting temperature of from 30 to 80° C. (first melt peak) and from 50 to 125 (second melt peak).

46. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, and wherein the composition further comprises a metallocene catalyzed copolymer of ethylene and 1-butene, 1-hexene, or 1-octene having a density of 0.86 to 0.900 g/cm³ and an Mw/Mn of 1.5 to 5.

47. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, and wherein the composition further comprises a metallocene catalyzed copolymer of ethylene and 1-butene, 1-hexene, or 1-octene having a density of 0.86 to 0.900 g/cm$^3$ and an Mw/Mn of 2.0 to 4.

48. A plasticized polyolefin composition comprising from 99.9 wt % to 60 wt % polyolefin; and from 0.1 wt % to 40 wt % of a non-functionalized plasticizer; wherein the non-functionalized plasticizer comprises $C_6$ to $C_{200}$ paraffins having a pour point of less than −30° C. and a Kinematic viscosity of from 10 cSt to 500 cSt at 100° C. and wherein elastomers are substantially absent from the composition, and wherein the polyolefin is selected from propylene homopolymers, propylene copolymers, propylene impact copolymers, or mixtures thereof, where the propylene impact copolymers are reactor blends, and wherein the composition further comprises a metallocene catalyzed copolymer of ethylene and 1-octene having a density of 0.86 to 0.900 g/cm$^3$ and an Mw/Mn of 1.5 to 5.

* * * * *